(12) United States Patent
Lin

(10) Patent No.: US 6,369,835 B1
(45) Date of Patent: Apr. 9, 2002

(54) METHOD AND SYSTEM FOR GENERATING A MOVIE FILE FROM A SLIDE SHOW PRESENTATION

(75) Inventor: Tony Hongtong Lin, Campbell, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/313,917

(22) Filed: May 18, 1999

(51) Int. Cl.[7] .............................................. G06F 17/30
(52) U.S. Cl. ..................................... 345/726; 345/730
(58) Field of Search ................................. 345/730, 731, 345/732, 723, 719–726, 704, 474, 547, 825, 805, 818; 700/17, 18, 28; 11/746, 747

(56) References Cited

U.S. PATENT DOCUMENTS

| | | | | |
|---|---|---|---|---|
| 5,500,936 A | * | 3/1996 | Allen et al. ................... | 345/730 |
| 5,539,658 A | * | 7/1996 | McCullough ............... | 345/730 |
| 5,553,221 A | * | 9/1996 | Reimer et al. .............. | 345/730 |
| 5,682,196 A | * | 10/1997 | Freeman ...................... | 348/13 |
| 5,782,692 A | * | 7/1998 | Stelovsky ...................... | 463/1 |
| 5,859,623 A | * | 1/1999 | Meyn et al ..................... | 345/1 |
| 5,969,716 A | * | 10/1999 | Davis et al. ................ | 345/723 |
| 6,061,056 A | * | 5/2000 | Menard et al. ............. | 345/704 |
| 6,072,480 A | * | 6/2000 | Gorbet et al. .............. | 345/302 |
| 6,128,712 A | * | 10/2000 | Hunt et al. .................. | 711/158 |
| 6,249,281 B1 | * | 6/2001 | Chen et al. ................. | 345/732 |
| 6,278,447 B1 | * | 8/2001 | Anderson .................... | 345/704 |

OTHER PUBLICATIONS

*Microsoft Power Point for Windows 95, Step by Step*, Microsoft Press, Redmond, Washington, 1995.*

* cited by examiner

Primary Examiner—Steven Sax
(74) Attorney, Agent, or Firm—Christensen O'Connor Johnson Kindness PLLC

(57) ABSTRACT

The present invention is directed to a method and system for generating a movie file from a slide show presentation created with a presentation program. When the movie file is played back, a movie of the slide show presentation is displayed to a user. Objects in the slide show presentation are identified and automatically transformed into corresponding movie data that is saved in the movie file. The movie data includes visual, e.g., video, and audio samples linked to respective tracks that are referenced to the slide show presentation. Also, the objects of the slide show presentation may be copied into the movie file so that an application program that recognizes the copied objects in the movie file may present the slide show presentation. The content of the movie file may be selected for compressing with a compression method and the user may select how to optimize the method. A movie application programming interface (API) such as "QuickTime" and "Video for Windows" is employed to create and save the movie data in the movie file. Also, the operating system is used to set file extensions/attributes to the movie file and indicate a format of the movie data in the movie file. The video and audio samples and their respective tracks may be edited with an editor that uses the movie API.

38 Claims, 22 Drawing Sheets

METHOD AND SYSTEM FOR GENERATING A MOVIE FILE FROM A SLIDE SHOW PRESENTATION

FIELD OF THE INVENTION

The present invention relates generally to transforming a document into a movie, and more particularly, to a method and system for transforming slides for a slide show presentation into movie data and saving the movie data in a movie file for display as a movie by any program capable of playing the movie file.

BACKGROUND OF THE INVENTION

Computer application programs often have associated data files that are processed by the programs during their normal execution. A data file can contain information that is processed and presented to a user either in a video presentation or an audio presentation, or a combination of video and audio. A presentation program is one example of a computer application program that processes an associated data file for displaying a visual/audio presentation to the user.

Presentation programs enable a user to create, edit, manage, and perform "presentations" such as a "slide show" with a computer. One example of a popular presentation program is "PowerPoint, " available from the "Microsoft Corporation," of Redmond, Wash. A slide show presentation includes a set of electronic "slides," each slide corresponding to one screen or page of output. An electronic slide may also be converted to a 35 mm or overhead transparency and displayed in a standard slide projector or overhead projector. Each slide contains one or more objects, such as text, graphical images, or graphic automation. A slide may also include sound and video objects that are played when the slide is displayed during a "slide show" performance.

A presentation program "performs" a slide show by sequentially displaying a series of slides contained within the slide show presentation. The slides are displayed on a computer screen or projected onto a separate surface. A "presenter" controls the presentation of the slide show by invoking a command that may "advance" to the next slide in the slide show or "return" to the previous slide. Other commands may cause the presentation to jump to a given slide (out of order) and/or play a sound. The commands may be customized so that the slide show is interactive with the user/presenter, e.g., a mouse click may be customized to animate a displayed object, play an audio sample or jump to another slide in the slide show presentation. Also, the commands may be entered with different types of user interface devices such as a keyboard, mouse, or touch screen display. It is envisioned that the presentation of the slide show can be viewed solely by the presenter or displayed for a larger audience.

Alternatively, a slide show presentation author may include slide "timings" with each slide in the slide show. A slide timing corresponds to a slide and indicates the number of seconds that the slide will be displayed before the presentation program automatically advances to the next slide in the slide show. The slide show presentation will automatically advance to the next slide in the slide show when the existing slide's timing ends. The ordered sequence for presenting slides and "events" on those slides is predetermined by a slide show presentation author. Also, during a presentation of a slide show, the presenter may enter commands that alter the sequence for displaying the slides or cause different events to occur.

Typically, a presentation program enables a user to save a slide show in an associated slide presentation file, so that the slide show can be recreated at another location that has access to the presentation program and the slide presentation file. Unfortunately, a presentation program such as "PowerPoint" is not common place and many computer users do not have access to this type of application program. In the past, slide presentation files were often distributed on a storage medium that also contained at least a display only version of the presentation program for graphically displaying the slide show to a user with the information stored in the slide presentation file. Since there is limited space available on a contemporary storage medium that is intended for mass distribution, the number and size of slide presentation files that can economically be distributed in this manner is presently limited. Additionally, since a slide show included in a slide presentation file must be displayed with some version of a presentation program, extra effort is required to locate, purchase and install the program before the slide show can be graphically displayed to other users, if not previously installed.

Typically, a presentation program, such as "PowerPoint," is used to create and save a slide show presentation in a file format that is proprietary to the program. Since only another application program that recognizes the file format of the presentation program can edit and/or view the slide show presentation, the presentation program must be installed on a computer before the slide show may be viewed.

Although many computers do not have a presentation program, almost every personal computer in use has at least one application program such as a browser that includes a facility for playing a movie file. The browser may be a stand alone application program such as "Internet Explorer" or the browser's functionality may be integrated into a computer operating system, e.g., the "Windows 98" operating system available from the "Microsoft Corporation." Examples of standard movie file formats include "Video for Windows" (".avi" files), available from "Microsoft Corporation" of Redmond, Washington, and "QuickTime" (".qtm", ".mov" or "MooV" files) available from "Apple Computer, Inc." Therefore, it is desirable to save the presentation of slides in a slide show as movie data in a movie file so that a movie of the slide show presentation may be displayed with any widely available application program capable of playing the movie file. It is also desirable to enable the user to edit/enhance the movie data generated from the slide show presentation.

SUMMARY OF THE INVENTION

The present invention is directed to a method, system and computer-readable medium for generating a movie file from a slide show presentation created with a presentation program. When the movie file is played, a movie of the slide show presentation is displayed. The slide show presentation is selected for saving as movie data in the movie file. Each type of object in the slide show presentation is identified and automatically transformed into the corresponding movie data.

In accordance with other aspects of this invention, the objects of the slide show presentation may be copied into the movie file. In this way, an application program that recognizes the objects of the slide show presentation in the movie file may be employed to open the file and produce the presentation.

In accordance with further aspects of the invention, the contents of the movie may be selected for compression. The user may select the type of compression method and optimization of the compression method.

In accordance with still further aspects of the invention, a movie application programming interface (API) such as "QuickTime" and "Video for Windows" may be selected to save the movie data in the movie file. File attributes (e.g., type or extension such as ".qtm", ".mov", ".avi" or "MooV") may be set on the movie file. Also, the type of the file extension attribute may be selected to indicate the format of the movie data in the movie file.

In accordance with yet other aspects of the invention, the movie data further comprises slide video samples that are disposed on a video track contained in a video media. The slide video samples correspond to a plurality of slides in the slide show presentation. The disposition of the slide video samples at positions on the video track are referenced to the presentation of the corresponding slides in the slide show presentation. A transition video sample is provided that corresponds to a transition between slides in the slide show presentation. Effect samples reside in the video media and are referenced from the same video track that references slide images. References to effect source samples are disposed on separate effect source tracks at the same time position as the corresponding effect sample reference. The transition video sample is referenced to a position on the video track that is disposed between a pair of slide video sample references that correspond to the order of a pair of slides in the slide show presentation that are disposed on opposite sides of the transition. The video media is a container for video data, the video data including the slide video sample, the transition video sample, effect source samples, the video track and the other video track. There may be multiple types of media, e.g., video, sound and sprite, stored in the movie file. Also, a reference may be disposed on the video track that points to a video sample residing in the video media.

In accordance with further aspects of the invention, the movie API provides for editing the movie data. The movie API may be employed to generate the movie data necessary to produce/call up a video effect including fade, wipe, move, swivel and spiral. Also, the movie API may be employed to select the key frame rate for the video sample, as well as other movie format specific parameters.

In accordance with further aspects of the invention, the user may select the number of colors to be used for an image in the video sample. Also, the user may select a size and a position of a display for playing back the movie in a display window. Additionally, the user may select a type of format for the contents of the movie file.

In accordance with yet other aspects of the invention, the user may select a default time period for playing back the video samples that correspond to the slides in the slide show presentation. The user may also select all of the Graphic Interchange Animation (GIF) format objects in the presentation to be transformed into video data. Additionally, the user may select a type of transformation method for generating video samples, including sprite-based, frame-based, and vector graphic-based. The transformation method may also be automatically determined based on the characteristics of the objects in the slide show presentation.

In accordance with yet other aspects of the invention, the movie data saved by the movie API may include audio samples disposed on an audio track that is contained in an audio media. Also, a reference may be disposed on the audio track that points to an audio sample residing in the audio media. The audio samples correspond to sounds produced for slides and transitions by the slide show presentation. A slide audio sample reference is disposed at a position on the audio track referenced to the corresponding sound produced for the slide by the slide show presentation. The transition audio sample corresponds to sound produced for a transition between slides by the slide show presentation. The transition audio sample reference is disposed at a position on another audio track referenced to the corresponding sound produced for the transition in the slide show presentation. The transition audio sample reference is also referenced to another position on the audio track between the slide audio samples that correspond to the slides in the slide show presentation that are disposed on opposite sides of the transition. The audio media is a container for audio data, including the slide audio samples, the transition audio samples, the audio track and the other audio track. The movie API may also provide functions such as an editor for editing the audio data.

In accordance with yet other aspects of the invention, the audio sample associated with a slide may include a slide narration sound sample, transition audio sample and a background sound sample.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Presentation programs, such as "PowerPoint," typically include user interfaces for enabling users to create, edit, view and save slide show presentations. Previously, presentation programs have provided for saving slide show presentations in proprietary file formats that were only recognized by the presentation programs. In contrast, the present invention enables a presentation program to save transformed slide show presentation objects in a standard movie file format, such as "QuickTime" and "Video for Windows." In this way, any application program that recognizes the format of the movie data in the movie file may be employed to play the movie file and display a movie of the slide show presentation. Thus, a movie that is representative of the slide show presentation may be viewed by a user that does not have access to the presentation program originally employed to create the slide show presentation.

Figure 1:
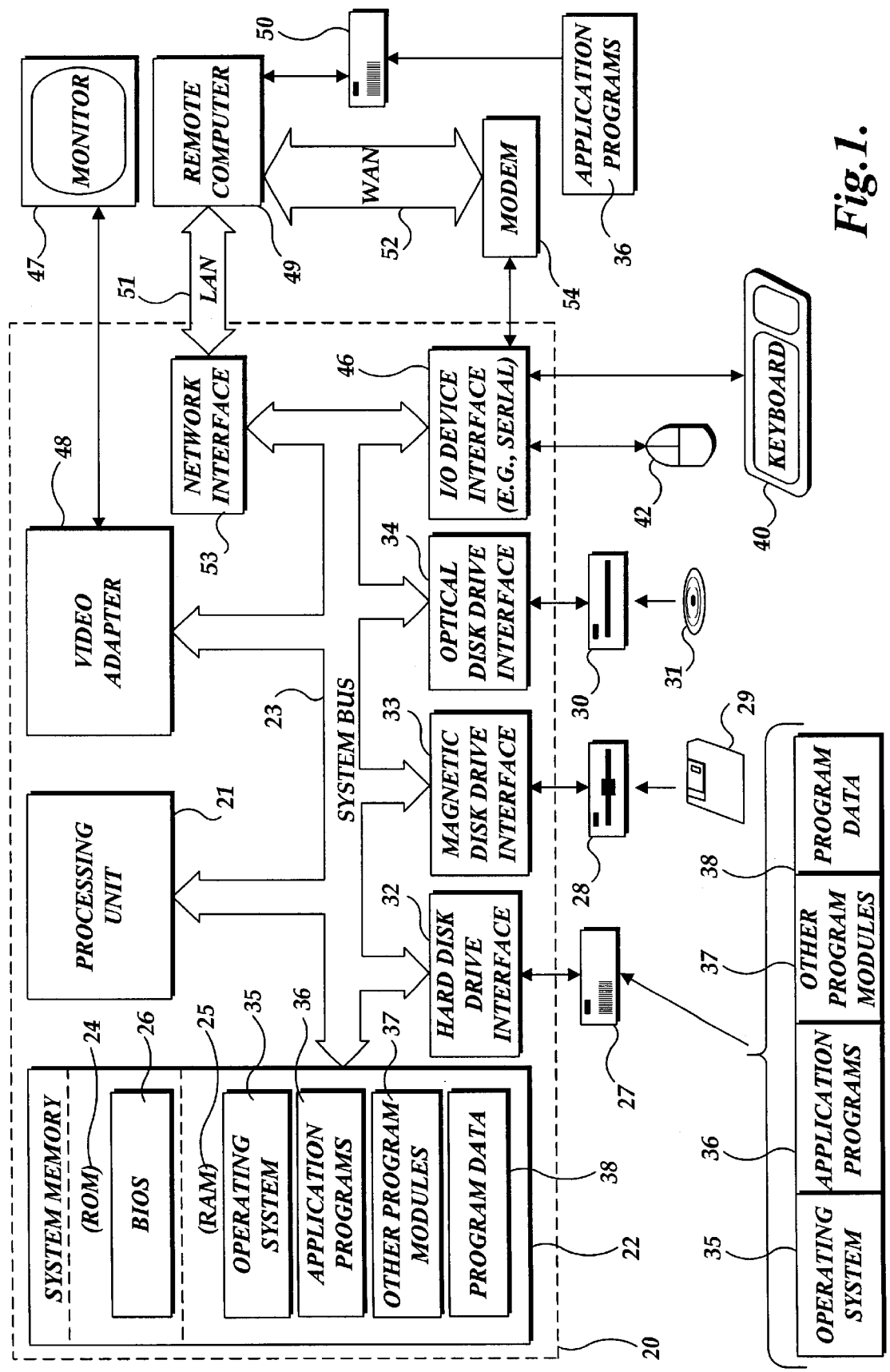
FIG. 1 is a block diagram of a general purpose computer system suitable for transforming and storing objects in the slide show presentation in a movie file in accordance with the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing worlds where tasks are performed by remote processing devices that are linked through a communications network. In a distributed computing world, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, or a local bus using any of a variety of bus architectures. The system memory includes read-only memory (ROM) 24 and random access memory (RAM) 25. A basic input/output system(BIOS) 26, containing the basic routines that help to transfer information between elements within the personal computer 20, such as during startup, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary world described herein employs a hard disk, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating world.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus (USB). A display 47 is also connected to the system bus 23 via an interface, such as a video adapter 48. One or more speakers (not shown) may also be connected to the system bus 23 via an interface, such as an audio adapter (not shown). In addition to the display and speakers, personal computers typically include other peripheral output devices (not shown), such as printers.

The personal computer 20 may operate in a networked world using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking worlds are commonplace in offices, enterprise-wide computer networks, intranets and the Internet.

When used in a LAN networking world, the personal computer 20 is connected to the local area network 51 through a network interface or adapter 53. When used in a WAN networking world, the personal computer 20 typically includes a modem 54 or other means for establishing communications over the wide area network 52, such as the Internet. The modem 54, which may be internal or external, is connected to the system bus 23 via the serial port interface 46. In a networked world, program modules depicted relative to the personal computer 20 or portions thereof, may be stored in the remote memory storage device 50. It will be appreciated that the network connections shown are exemplary, and other means of establishing a communications link between the computers may be used.

Figure 2:
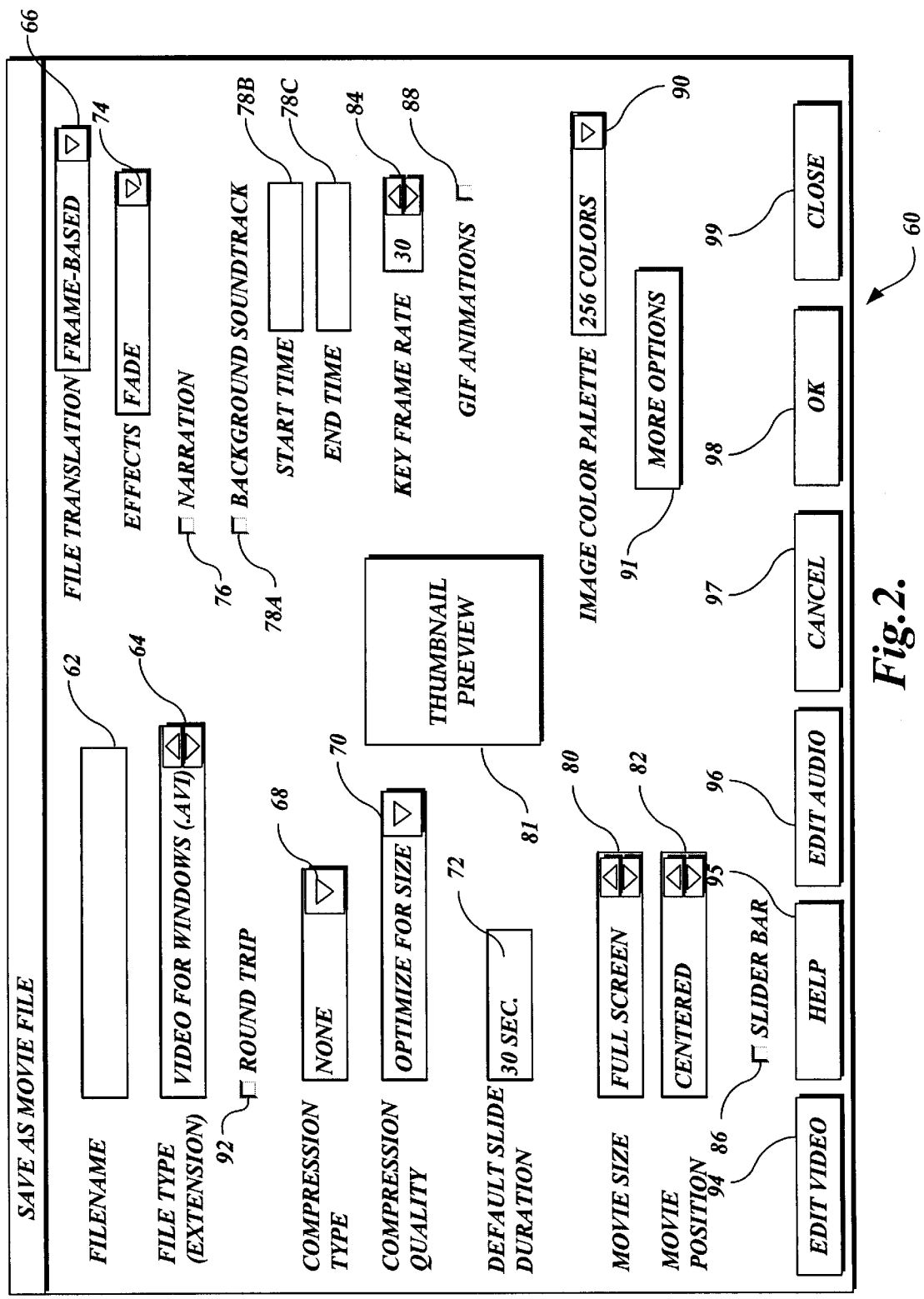
FIG. 2 illustrates an exemplary user interface for storing objects in the slide show presentation in a movie file in accordance with the present invention.

A presentation program, such as "PowerPoint," typically includes a user interface for enabling a user to create, edit, view and save a slide show presentation. Previously, a presentation program only provided for saving the objects in a slide show presentation in a format that was proprietary to (i.e., only understood by) the program. In contrast, the present invention provides for transforming slide show presentation objects into movie data with a standard movie format, such as "QuickTime" and "Video for Windows," and saving the transformed slide show presentation objects in a movie file. As illustrated in FIG. 2, the present invention provides a graphical user interface window 60 for allowing the user to select different options related to transforming the objects in a slide show presentation into movie data that is saved in a movie file.

The user interface window 60 is labeled "Save as Movie File" and the window illustrates several selectable controls such as a fill-in box 62 for entering/editing a file name to be used when saving transformed slide show presentation objects in a movie file. If it is the first time that the transformed slide show presentation objects, i.e., movie data, has been saved in a movie file, the file name in the fill-in box 62 will default to empty (i.e., no default file name). However, if the movie data has previously been saved in a movie file (e.g., a previously saved file is opened for editing), the file name in the fill-in box 62 will default to the last file name used to identify the movie data saved in the movie file. A spinner control 64 is provided for selecting a file name extension for the file name. A list of default file name extensions are provided for indicating the type of movie format for the movie data saved in the movie file, e.g., the ".avi" file name extension indicates the "Video for Windows" movie file format.

Slide show presentation objects may be transformed into video samples, i.e., movie data, with different types of transformation methods. In one embodiment, the format of the transformation method may be automatically determined based on certain characteristics of the objects of the slide show presentation. The present invention may automatically select the transformation format from a list that includes sprite-based, frame-based, and vector-based formats. In another embodiment, the automatic determination of the type of transformation format is a user-modifiable default. In yet another embodiment, the user may select a transformation format using a spinner control 66 disposed in the Save as Movie File user interface 60.

A file compression method may be selected for compressing the contents of the movie file. A drop-down menu 68 is provided for selecting the type of compression, if any, such as the Motion Pictures Expert Group "MPEG" compression method. A drop-down menu 70 is also provided for optimizing selected aspects of the compression method. For example, the user may choose to optimize the fidelity (quality) of the video samples or the size (as shown) when compressing the contents of the movie file. It is also envisioned that the file compression method may be automatically selected and/or optimized by the present invention. Although not shown, the present invention may select the file compression method that is most compatible with an intended target system. For example, if most of the intended target systems support MPEG-2, the present invention would employ this compression method to compress the contents of the movie file.

A presentation program, such as "PowerPoint," enables the user to change the amount of time that a slide is displayed either manually or based on a pre-determined time increment associated with the displayed slide. Also, each slide may be associated with a differently sized time increment. Since a movie file should play without having to manually select when each scene, i.e., slide, is to be displayed, the present invention provides for defining the amount of time (increment) for displaying each slide/scene in the movie file during the transformation process. For example, if the user has specified a time increment for a particular slide in the slide show presentation, the present invention will employ the same time increment to display that slide/scene in the movie file. A fill-in box 72 is provided for indicating the default time increment for slides in the transformed slide show presentation objects that are not associated with a specific time increment. The selection of a check box 86 causes a slider bar control to be provided by the movie API when the movie file is played in a browser. The slider bar control may be used to control the play back of the movie by scrolling (backwards and forwards), rewinding and fast forwarding.

A presentation program may include an audio narration with a slide(s) in the slide show presentation. A check box 76 enables the user to choose whether or not to include an audio narration with the movie data saved in the movie file. A check box 78A is provided for selecting the inclusion of a background soundtrack for the slide show presentation in the movie file. Also, a fill-in box 78B and a fill-in box 78C are provided for choosing the start time and end time, respectively, for a background soundtrack that is included in the movie file. When a button 96 is selected, additional controls (not shown) for editing the audio tracks in the movie file are displayed. These additional controls may be provided by the audio API associated with the movie API, e.g., the "QuickTime" API.

A spinner control 80 is provided for selecting the displayed size of the movie file, e.g., the user may select a full screen display (as shown). Another spinner control 82 is provided for choosing the position of the display of the movie file in a display window. For example, the position of the display may be centered (as shown) in the display window. A drop-down menu 74 provides for selecting various video effects, e.g., wipes, fades, move, spiral and swivel, to be included in the movie file. Additionally, a button 94 provides for selecting the display of other video related controls (not shown) that are included with the movie API for editing the movie file.

A check box 88 is provided for selecting every GIF object in the presentation to be included as an animated image (video data) in the movie file. A drop-down menu 90 is also provided for choosing the number of colors in the color palette used to display images in the movie file. The size of the color palette is an important factor in determining the quality of the displayed image. Also, the number of colors chosen for the color palette directly impacts the amount of data (size) stored in the movie file. For example, a 256 color palette (as shown) movie file has a size that is approximately a tenth of the size of another movie file that has a 6.7 million color palette.

A spinner control box 84 is provided so that the user may select the key frame rate for the movie file (30 is shown). When a check box 92 is selected, the movie file will be saved as a "round trip" movie file. If the movie file is saved as a round-trip file, a copy of the original slide show presentation data is saved along with the movie data in the movie file. The presence of the copied slide show presentation objects in the movie file does not interfere with the play back of the movie with a movie player facility. Similarly, the disposition of the movie data in the movie file does not interfere with viewing and editing the copied slide show presentation objects with the presentation program. Additionally, a thumbnail movie preview box 81 may be provided so that the user can immediately see what effect a selected change to a movie parameter will have on the play back of the movie before saving the changed parameter.

The selection of an OK button 98 confirms the options selected in the user interface window 60. When a close button 99 is selected, the user interface window 60 is closed. If a cancel button 97 is selected, the user interface window 60 closes and the present invention also disregards any changes to the options in the window. Also, the selection of a help button 95 causes a facility to display information explaining the options that are selectable in the user interface window 60.

Additionally, the selection of a more options button 91 will cause a facility to display another window (not shown) that contains more options for creating, editing and playing back a movie file for a slide show presentation. These more options may include: (1) a check box for selecting a looping option, i.e., off or on; (2) a check box for causing the movie file to be saved in a streaming format; (3) a text box for entering copyright information for an image in the movie file; (4) a text box for creating speaker notes that are embedded in a text track for the movie file; (5) a drop down menu for selecting the type of frame for the play back of the movie file; (6) a control for enabling the use of chapters with the movie file; (7) a check box for selecting hyperlink information to be included in the movie file; (8) a check box for selecting the movie within a movie option; and (9) a check box for selecting the inline movie option.

Figure 3A:
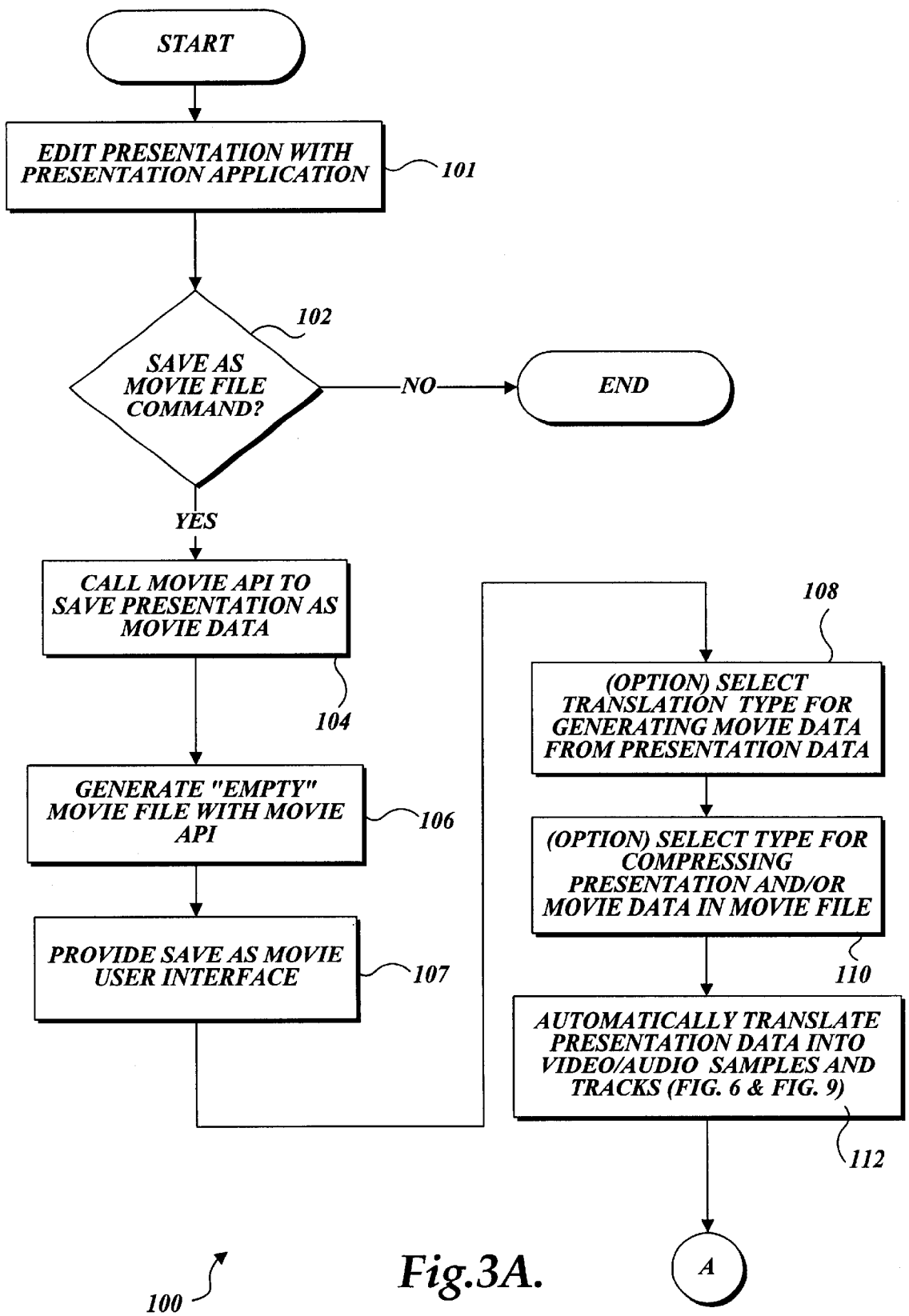
FIGS. 3A and 3B illustrate an overview of a flow diagram for generating a movie file from slide show presentation objects.
Figure 3B:
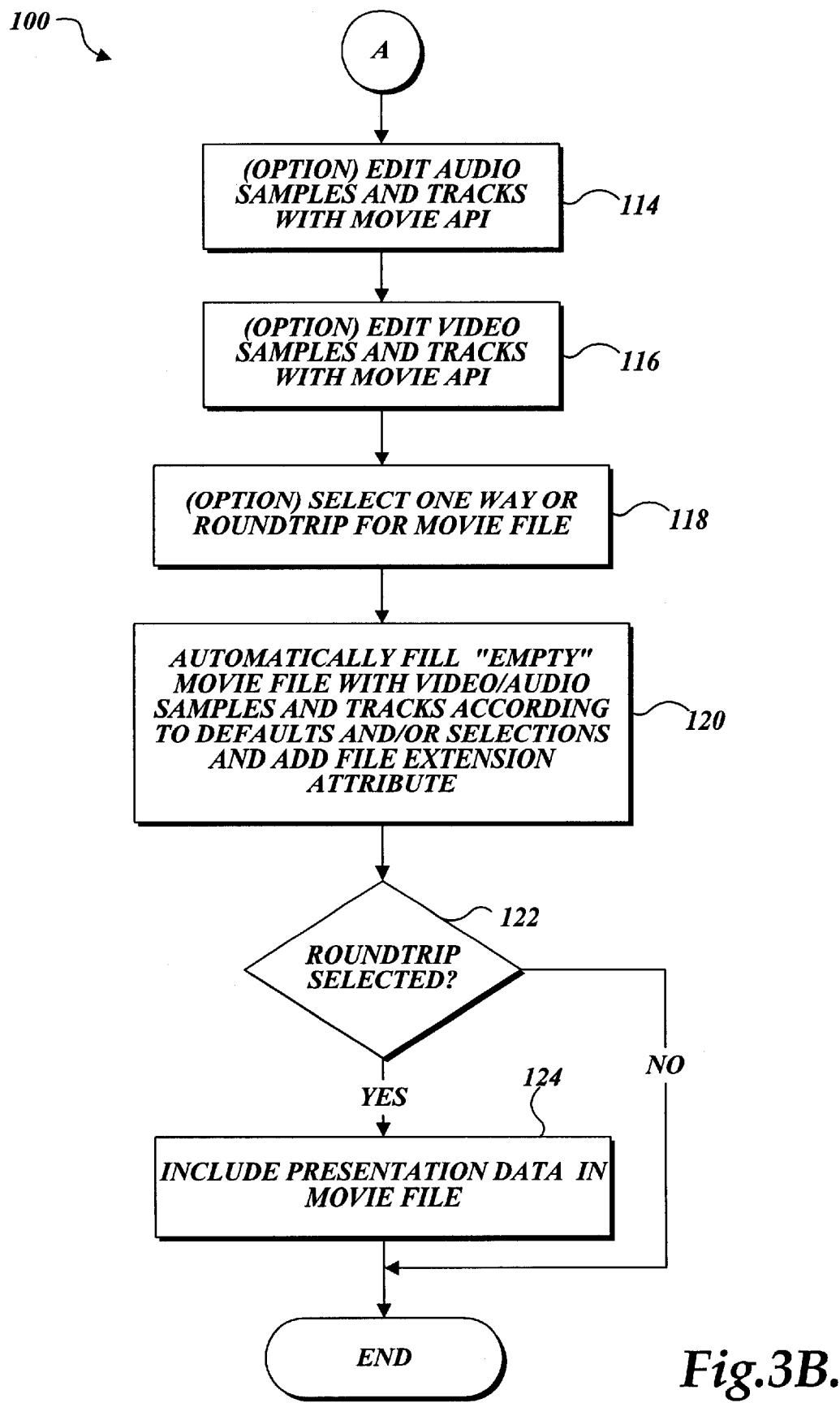

FIG. 3A and 3B are flow diagrams that illustrate an overview 100 of the logic for saving a slide show presentation as a movie file in accordance with the present invention. The logic in FIG. 3 begins in a start block and proceeds to a block 101 where the presentation is created and/or edited with a presentation program, such as "PowerPoint." Moving to a decision block 102, a test is made to determine if a "Save As Movie File" command is selected. In one embodiment, a facility is integrated with the presentation program so that the "Save As Movie File" command may be selected from within the presentation program. If false, the logic flow of the present invention terminates. However, when the determination at the decision block 102 is true, i.e., the "Save As Movie File" command is selected, the logic will step to a block 104 where a movie API such as "QuickTime" is called so that a variety of movie API functions may be accessed for determining how the objects in the slide show presentation are transformed into movie data and saved in a movie file.

Proceeding to a block 106, the movie API generates a new empty movie file, or alternatively, opens up an existing movie file for editing. The logic then advances to a block 107 where a graphical user interface window 60 is displayed. An example of a preferred embodiment of the graphical user interface window 60 is illustrated in FIG. 2, and described in detail above. In the graphical user interface window 60, various options may be selected for transforming the slide show presentation objects into movie related data and saving the movie data in the movie file. In a block 108, the user may optionally select the type of method for transforming the slide show presentation objects into movie data and in a movie format that is suitable for storing in the movie file. At least three types of methods for transforming the objects in the slide show presentation into movie data are: (1) sprite-based transformation; (2) frame-based transformation; and (3) vector-based transformation.

Additionally, the present invention may provide for automatically employing the content of the presentation to determine the type of transformation method. For example, a frame-based transformation method is automatically selected when the slide show presentation includes a relatively large number of highly-detailed slides that are substantially different than the other slides in the slide show presentation. Also, the present invention may automatically select a sprite-based transformation method when the content of the presentation includes an animated shape such as an cartoon and/or an interactive shape(s), e.g., the selection of a graphic image causing the display of the next slide in the presentation. Alternatively, the present invention may automatically choose a vector-based transformation method when the content of the presentation includes a relatively large number of basic animated shapes. It is envisioned that another embodiment might provide a default type of transformation method based on the content of the presentation that may be modified by the user.

Next, the logic moves to a block 110 where the user may optionally select a type of compression method to selectively compress the data saved in the movie file. Proceeding to a block 111, the logic automatically employs the determined/selected transformation method to convert at least a portion of the objects in the slide show presentation into movie data with a movie format that is suitable for the movie file.

The present invention defines a sample to be a chunk of data such as video, audio and text that is generated from transforming objects in the slide show presentation. A video media is employed as a container for the video samples in the movie data and an audio media is used as a container for the audio samples. The movie data includes a track data structure that references the segment (position) on the track occupied by a sample to the corresponding order and timing of the corresponding object(s) in the slide show presentation. Each track is a timeline with marks (references) that denote when the movie API should begin playing samples from an identified media (container).

Figure 6:
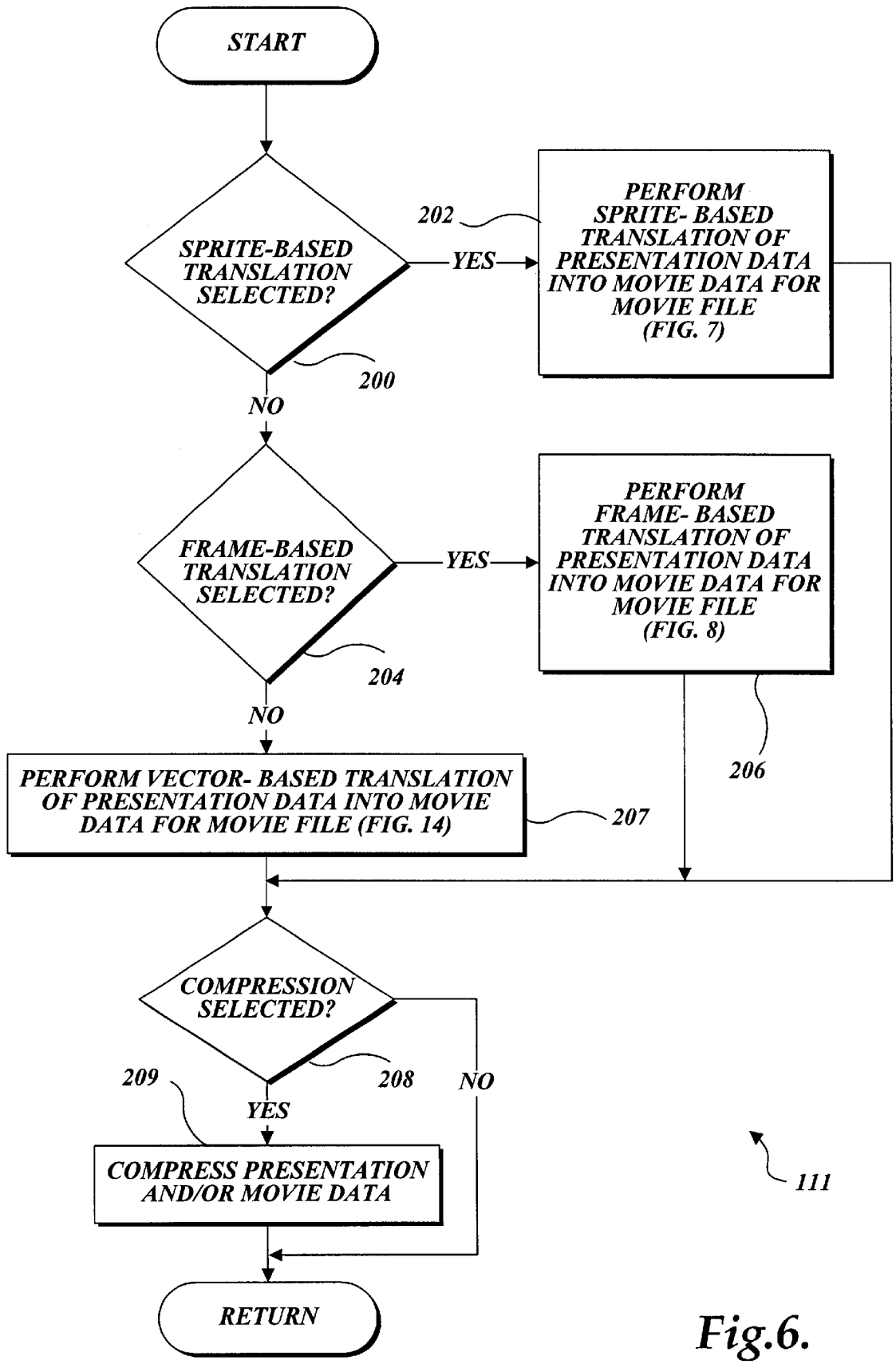
FIG. 6 is a flow diagram illustrating an overview of transforming the objects in the slide show presentation into video samples for a movie file.

In FIG. 6, the logic of block 111 is illustrated in detail for transforming at least a portion of the objects in the slide show presentation into video samples that are suitable for saving in the movie file. Turning to FIG. 6, the logic moves from a start block to a decision block 200 where a test is made to determine if a sprite-based transformation method is selected. If so, the logic proceeds to a block 202 where the sprite-based transformation method is performed on the objects in the slide show presentation to generate video samples in a format that is suitable for saving in the media for the movie file.

Figure 7:
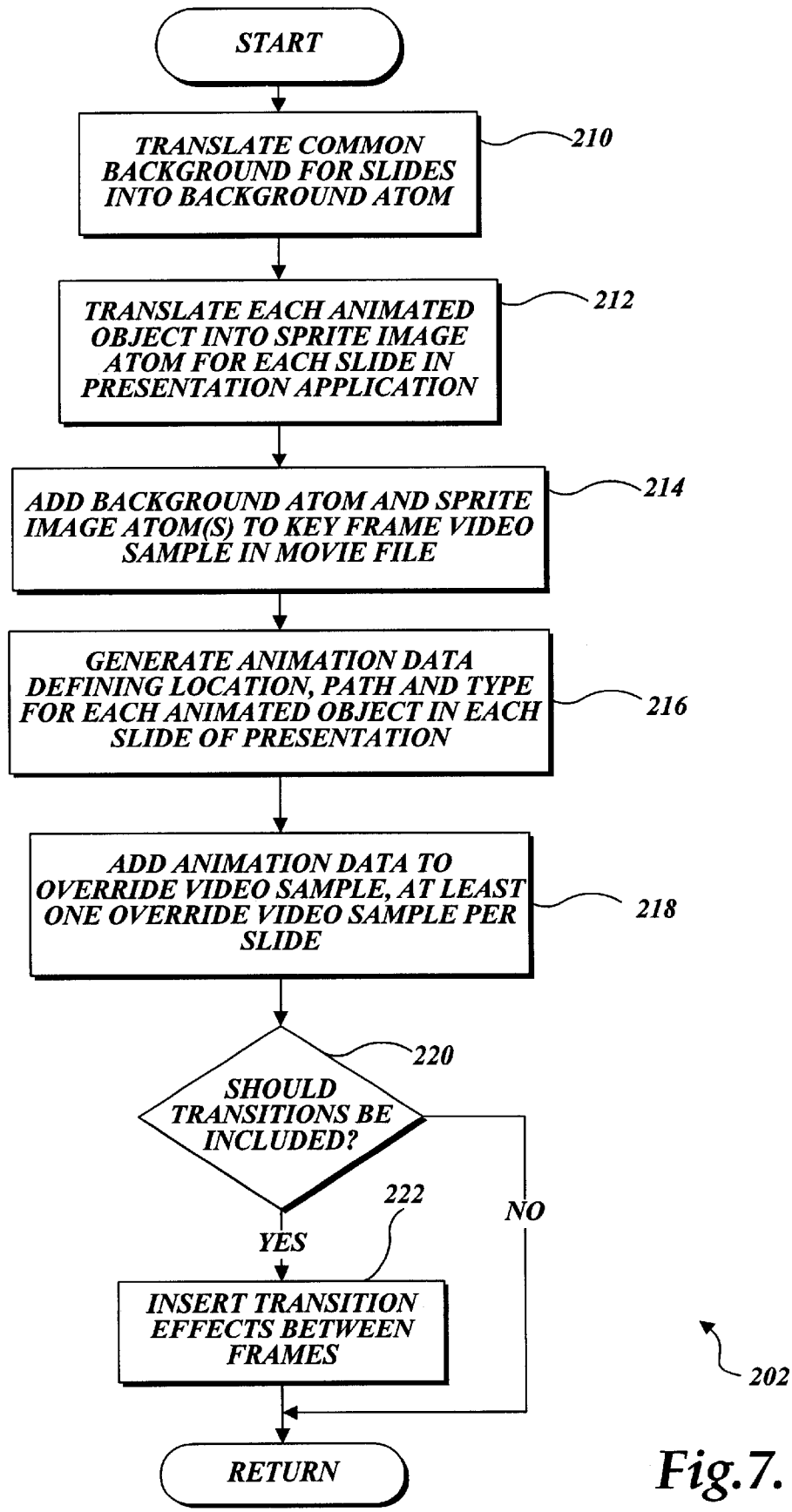
FIG. 7 is a flow diagram illustrating sprite-based transformation of objectsin the slide show presentation into video samples for a movie file.

In FIG. 7, the logic performed at the block 202 is illustrated in greater detail. From a start block in FIG. 7, the logic advances to a block 210 where a common background for slides in the presentation and non-animated shapes in the common background are composited to form a background atom. The logic proceeds to a block 212 where the initial disposition of each animated object in the common background is transformed into a sprite atom associated with a sprite image. Flowing to a block 214, the background atom and sprite atom(s) are composited and added to a key frame video sample in the media for the movie file. The logic proceeds to a block 216 where animation data related to the location, path, and type of each animated object in each slide of the slide show presentation is generated for each sprite image and saved in the video media of the movie file. Also, information linking the sprite image to another slide, action, and/or a hypertext link is generated and saved in the video media.

In a block 218, animation data for the sprite image is generated and employed to create an override video sample for "overriding" the display of the sprite image in the key frame video sample. Typically, at one override video sample is created for each slide in the presentation, and another one for each animation step on that slide. The override video samples may cause the sprite image to become visible and/or disappear and move from its initial disposition to another location while simultaneously displaying or moving other sprites from the key frame video sample. At a decision block 220, a test is made to determine if there is a transition between the slides in the slide show presentation. If so, the logic proceeds to a block 222 where a video sample relating to each slide transition is inserted between the associated key frame samples in the video data. Next, the logic terminates in an end block and returns to the block 202 as illustrated in FIG. 6. Also, if the determination at the decision block 220 is false, the logic will jump directly to the end block and return to the block 202 in FIG. 6.

Returning to FIG. 6, if in decision block 200 it is determined that the sprite-based transformation method is not selected, the logic proceeds to a decision block 204 where a test is made to determine if the frame-based transformation method is selected. If so, the logic proceeds to a block 206 where the frame-based transformation method is performed on the objects in the slide show presentation.

Figure 8:
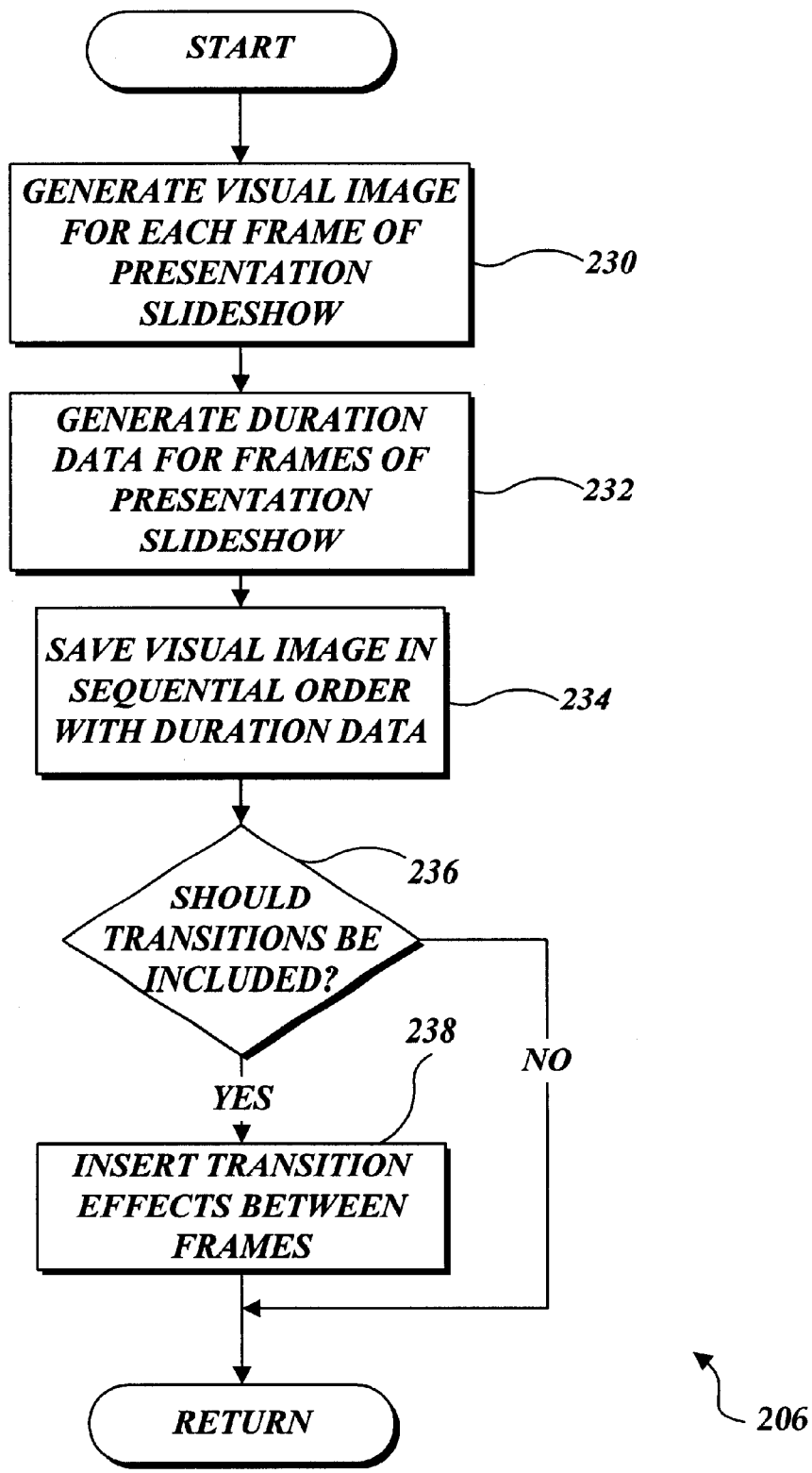
FIG. 8 is a flow diagram illustrating frame-based transformation of objects in the slide show presentation into video samples for a movie file.

In FIG. 8, the logic of the frame-based transformation method in the block 206 is illustrated in detail. From a start block in FIG. 8, the logic advances to a block 230 where a visual image is generated for each slide in the slide show presentation. It is understood that the present invention may also generate visual images that include a metafile (picture) and an encoded image data chunk. The logic then proceeds to a block 232 where the duration data for each slide in the slide show presentation is generated. The logic then moves to a block 234 where the bitmaps, pictures, or encoded data chunks are saved in sequential order with the duration data. The logic then moves to a decision block 236 where a test is made to determine if there are slide transitions. If there are slide transitions, the logic proceeds to a block 238 where the slide transitions may be inserted in between the appropriate presentation frames. Although not shown in block 234, it is envisioned that the slide transitions may be automatically added in sequential order along with the presentation frames when the logic saves the visual images and the duration data. It is also envisioned that the logic in the blocks 230, 232, 234, and 238 may employ API calls that are supplied by a movie API, such as "QuickTime." The logic for performing the frame-based transformation method terminates in an end block and returns to a decision block 208 in FIG. 6.

Figure 14:
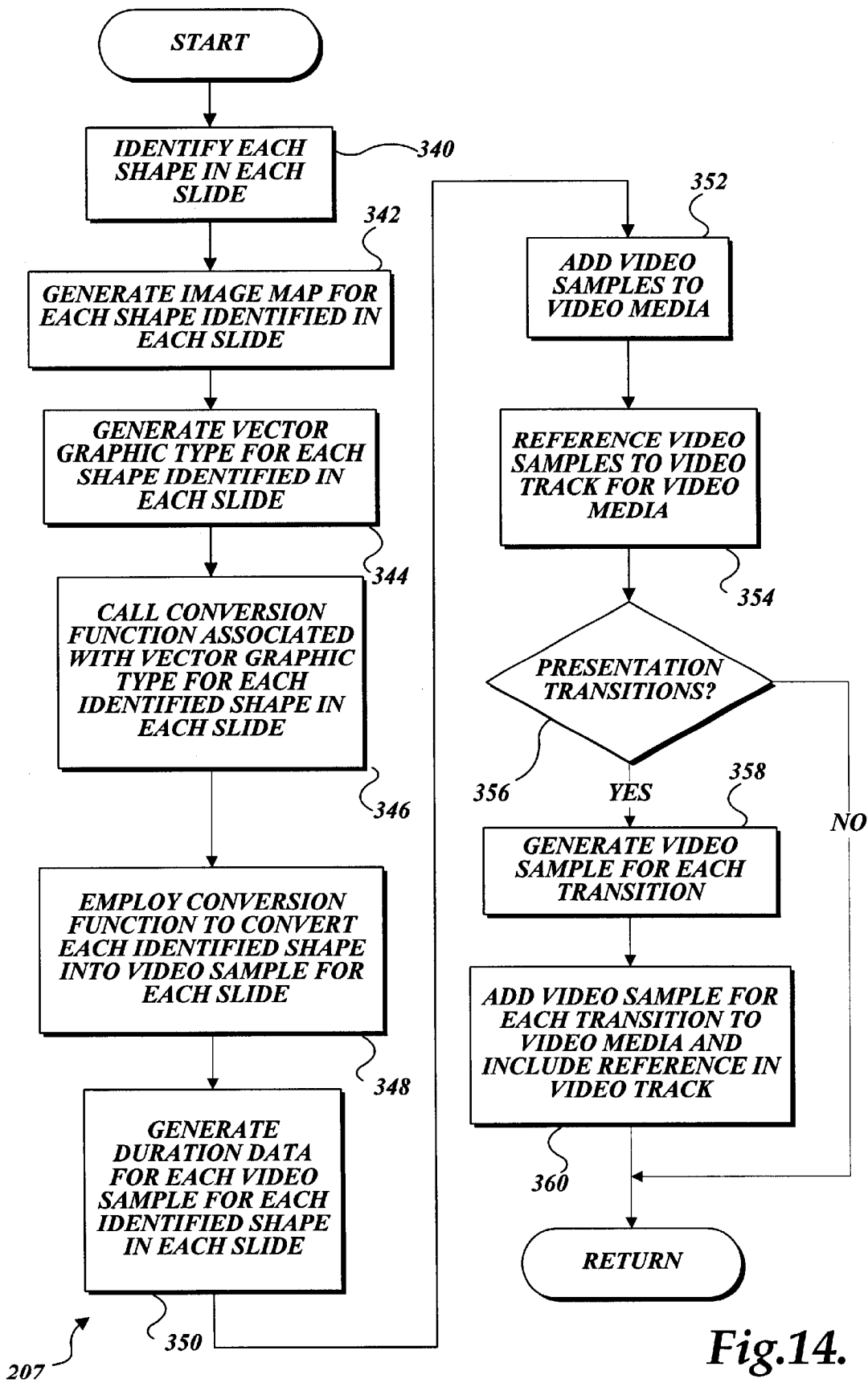
FIG. 14 is a flow diagram that shows vector graphics-based transformation of objects in the slide show presentation into video samples for a movie file.

Returning to FIG. 6, if it is determined at the decision block 204 that the frame-based transformation method is not selected, the logic steps to a block 207 where the vector-based transformation method is performed on the objects in the slide show presentation. In FIG. 14, the logic performed at the block 207 is illustrated in detail.

Moving from a start block in FIG. 14, the logic steps to a block 340 where each shape in each slide is identified. At a block 342, a table is generated for matching internal shape types of each shape in a slide to the shape types with vector graphics support. Advancing to a block 344, the logic generates a vector graphic shape type for each identified shape in each slide. At a block 346, a table of conversion functions is accessed and an appropriate conversion function is found and called. The function table includes a conversion function for converting each identified shape into a video sample that includes the type of vector graphic shape. Moving to a block 348, the table of conversion functions are employed to convert each identified shape in each slide into a video sample for the type of vector graphic shape associated with the identified shape.

Next, duration data is generated for each video sample of each vector graphic shape. The duration data is employed to indicate when each video sample is visible and non-visible during play back of the movie file. At a block 352, the video samples are added to the video media in the movie file. Advancing to a block 354, a reference for each video sample is added to a video track for the video media. At a decision block 356, a test is made to determine if the presentation includes transitions between each slide. If so, the logic flows to a block 358 and a video sample is generated for each transition. At a block 360, each transition video sample is added to the video media and a reference for each transition video sample is added to the video track. The logic returns to the decision block 208 in FIG. 6. Also, if the test at the decision block 356 was false, the logic will return to the decision block 208.

Returning to FIG. 6, the logic advances to the decision block 208 where a test is made to determine if a compression method is selected for compressing the video sample in the movie file. The compression methods may include MPEG, JMPEG and other methods. If so, the logic proceeds to a block 209 where the selected compression method is performed on the video samples in the media for the movie file. The compression may also occur on samples before they get added to a media. The logic moves to an end block and returns to a block 112 in FIG. 3A where the present invention automatically transforms the audio data of the presentation into audio samples that are suitable for storing in the media for the movie file. The logic at the block 112 for transforming the presentation's audio data into an audio sample is illustrated in detail in FIG. 9.

Figure 9:
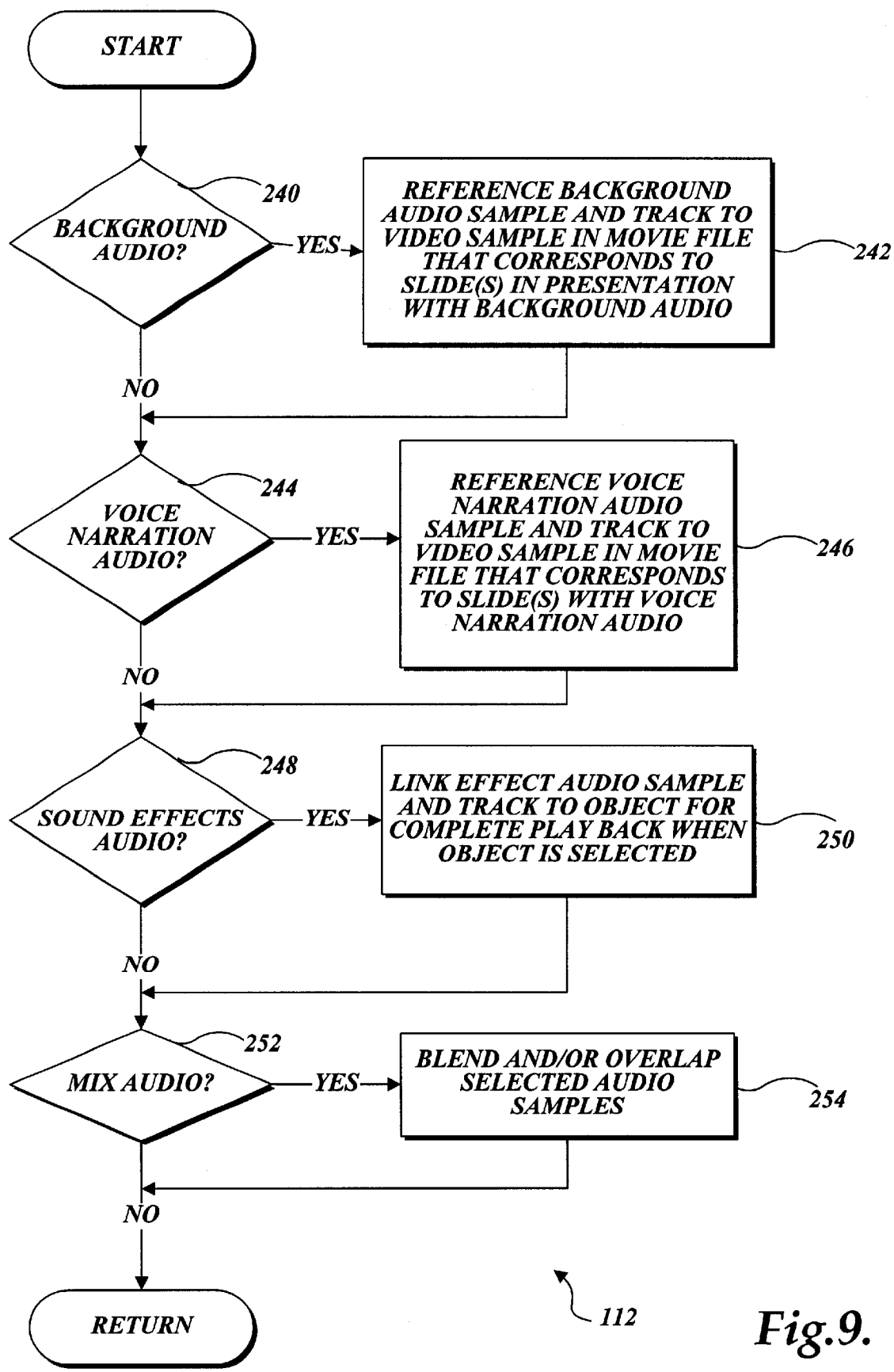
FIG. 9 is a flow diagram transforming objects in the slide show presentation into audio tracks for a movie file.

The logic in FIG. 9 moves from a start block to a decision block 240 where a test is made to determine whether the background audio for a slide(s) in the presentation is selected for saving in the movie file. If true, the logic moves to a block 242 where a background audio sample is generated and added to an audio track that is associated with a video sample in the movie file that corresponds to the slide(s) in the presentation that has background audio. The background audio sample may be selected to run from the start of playing the movie file until its end, or it may be selected to run for a defined interval. It is also envisioned that several background audio tracks may be included in the movie file. Also, for some types of movie file, e.g., some types (versions) of "QuickTime" movie files, the present invention may save a background audio sample in the audio media and position a reference on the audio track that points to the background audio sample in the audio media.

Next, the logic proceeds from the block 242 to a decision block 244 where a test is made to determine if voice narration audio is selected to be included in the movie file. Also, if the determination at the decision block 240 is false, the logic will advance directly to the decision block 244. When the determination at the decision block 244 is true, i.e., voice narration audio is selected for the movie file, the logic proceeds to a block 246 where voice narration audio samples are generated and added to a voice narration audio track that is associated with (same start time as) a video sample in the movie file that corresponds to the slide(s) in the presentation that has voice narration audio. Typically, one audio narration track is provided for each narrated slide. However, it is also envisioned that multiple audio narration tracks may be provided for a narrated slide.

The logic proceeds from the block 246 to a decision block 248 where a test is made to determine if sound effect audio is selected to be included with an object in the movie file. Also, if the determination at the decision block 244 is false, the logic will advance directly to the decision block 248. If the determination at the decision block 248 is true, i.e., the sound effect audio is selected for an object(s) in the movie file's video sample, the logic proceeds to a block 250 where a sound effect audio sample(s) are generated and added to the sound effect audio track(s) in such a way that they are linked to the object(s) in the movie file for complete playback when the object(s) is selected. When the display (or activation of interactive sprite) of the linked object is selected during the play back of the movie file, the associated sound effect audio sample(s) are played. The present invention can provide one sound effect track in the movie file for each slide associated with an object with a sound effect. It is also envisioned that sound effect references may be disposed on a single track and each reference would point to a sound effect sample that resides in an audio media included with the movie file.

The logic proceeds from the block 250 to a decision block 252 where a test is made to determine if a mix of the audio tracks is selected to be included in the movie file. Also, if the determination at the decision block 248 is false, the logic will advance directly to the decision block 252. If the determination at the decision block 252 is true, the logic will step to a block 254 and two or more selected audio tracks are blended and/or overlapped. The logic moves from the block 254 to an end block and the logic returns to the main program flow in FIG. 3A. Also, if the determination at the decision block 252 is false, the logic will advance directly to the end block and return to the logic illustrated in FIG. 3A.

Returning to FIG. 3A at the block 112, the logic proceeds to a block 114 (FIG. 3B) where the audio tracks may be optionally edited with functions provided by the movie API such as "QuickTime." Moving to a block 116, the video samples in the movie file may be optionally edited using the functions provided with the movie API. Advancing to a block 118, the movie file may be optionally selected to be either a round-trip or a one-way file. A round-trip movie file includes all of the movie data necessary for playing the movie file along with the objects in the slide show presentation that were employed to generate the movie data saved in the movie file. The objects in the slide show presentation are saved in the round trip movie file in the proprietary format of the presentation program, so that the presentation program may open the movie file and display the slide show presentation.

The logic then proceeds to a block 120 where the empty movie file or non-empty movie file open for editing is automatically filled with or modified to have the generated samples and tracks for the video and audio according to defaults and/or selections made by the user. File extensions/attributes are then added, based on the movie file format, e.g., ".qtm", ".mov", or "MooV" for a "QuickTime" API based movie file. The logic flows to a decision block 122 where a test determines if the movie file is a selected to be a round-trip movie file. If so, the logic proceeds to a block 124 where the objects in the slide show presentation employed to generate the movie data are added to the movie file. Next, the logic steps to an end block and terminates. Also, if the determination at the decision block 122 is false, the logic will step directly to the end block and terminate.

Figure 10:
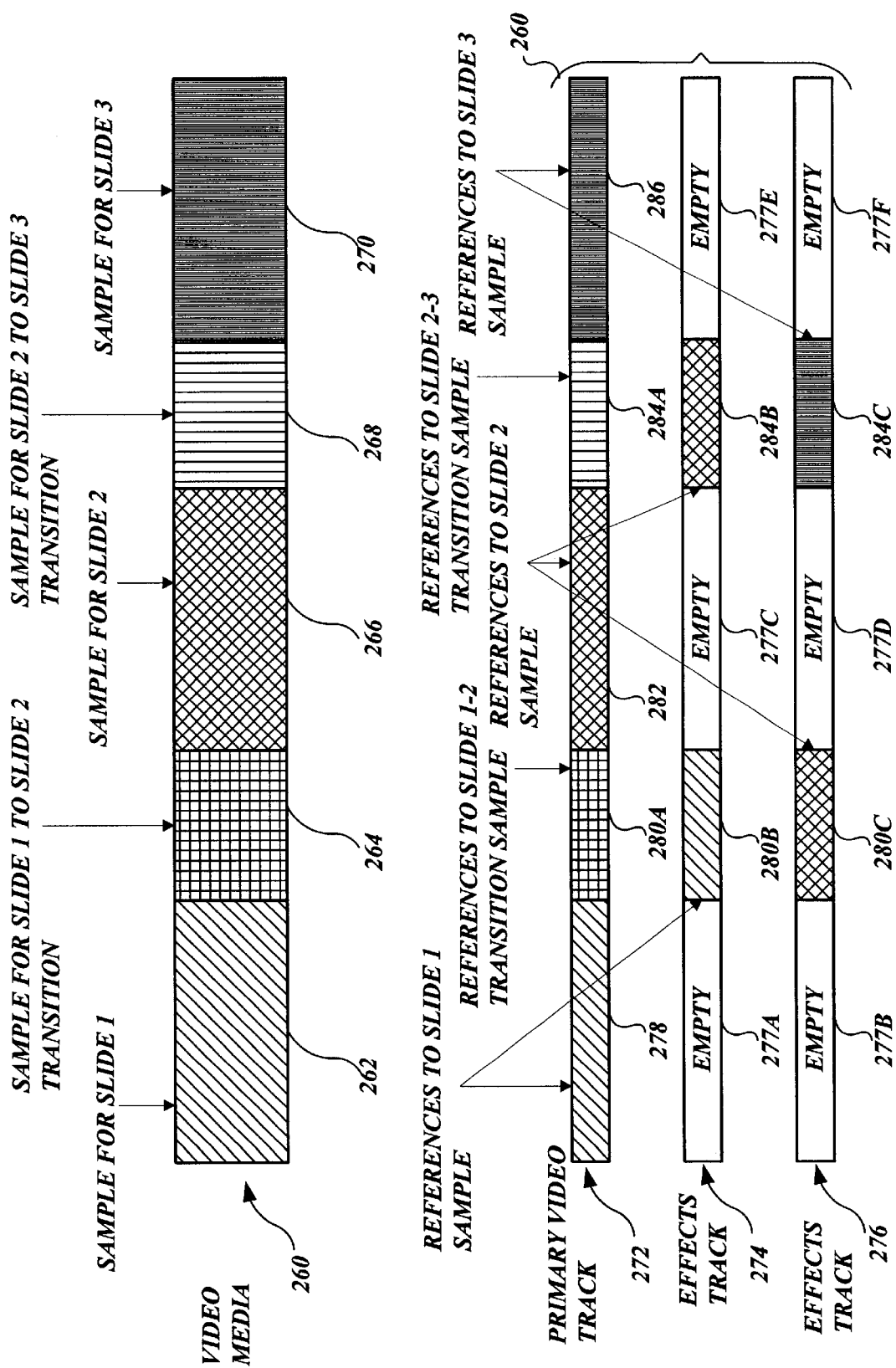
FIG. 10 illustrates an example of the details of video samples including transitions generated with frame-based transformation.

FIG. 10 illustrates a video media 260 for visual (video) samples and tracks generated with the frame-based transformation method from a presentation that includes transitions between slides. The video media 260 is comprised of a series of video samples representing each slide and transition in the presentation. Transition video samples are interspersed between slide video samples that are positioned on (referenced) a primary video track 272. The video media includes a first slide video sample 262 that is followed by a video sample 264 for a first transition. Next, a second slide video sample 266 is followed by a second transition video sample 268. A third slide video sample 270 ends the video media 260 shown in FIG. 10. The organization of the video media 260 is determined by referencing the positions of video samples on the primary video track 272 and a pair of effect source tracks 274 and 276.

As illustrated in FIG. 10, the first slide video sample 262 is a combination of a video sample 278 disposed on the primary video track 272, an empty track segment 277A disposed on the effect source track 274 and another empty track segment 277B positioned on the effect source track 276. Similarly, the second slide video sample 266 is a combination of a video sample 282 positioned on the primary video track 272, an empty track segment 277C disposed on the effect source track 274 and another empty track segment 277D positioned on the effect source track 276. Also, the third slide video sample 270 is a combination of a video sample 286 disposed on the primary video track 272, an empty track segment 277E positioned on the effects source track 274 and another empty track segment 277F disposed on the effect source track 276.

Additionally, as illustrated in FIG. 10, the first transition video sample 264 is a combination of a video effect sample 280A disposed on the primary video track 272, a video effect sample 280B positioned on the effect source track 274 (and referenced to the video sample 278) and another video effect source sample 280C disposed on the effect source track 276 (and referenced to the video sample 282). Similarly, the second transition video sample 266 is a combination of a effect sample 284A positioned on the primary video track 272, an video effect source sample 284B disposed on the effect source track 274 and another video effect source sample 284C positioned on the effect source track 276.

Figure 11:
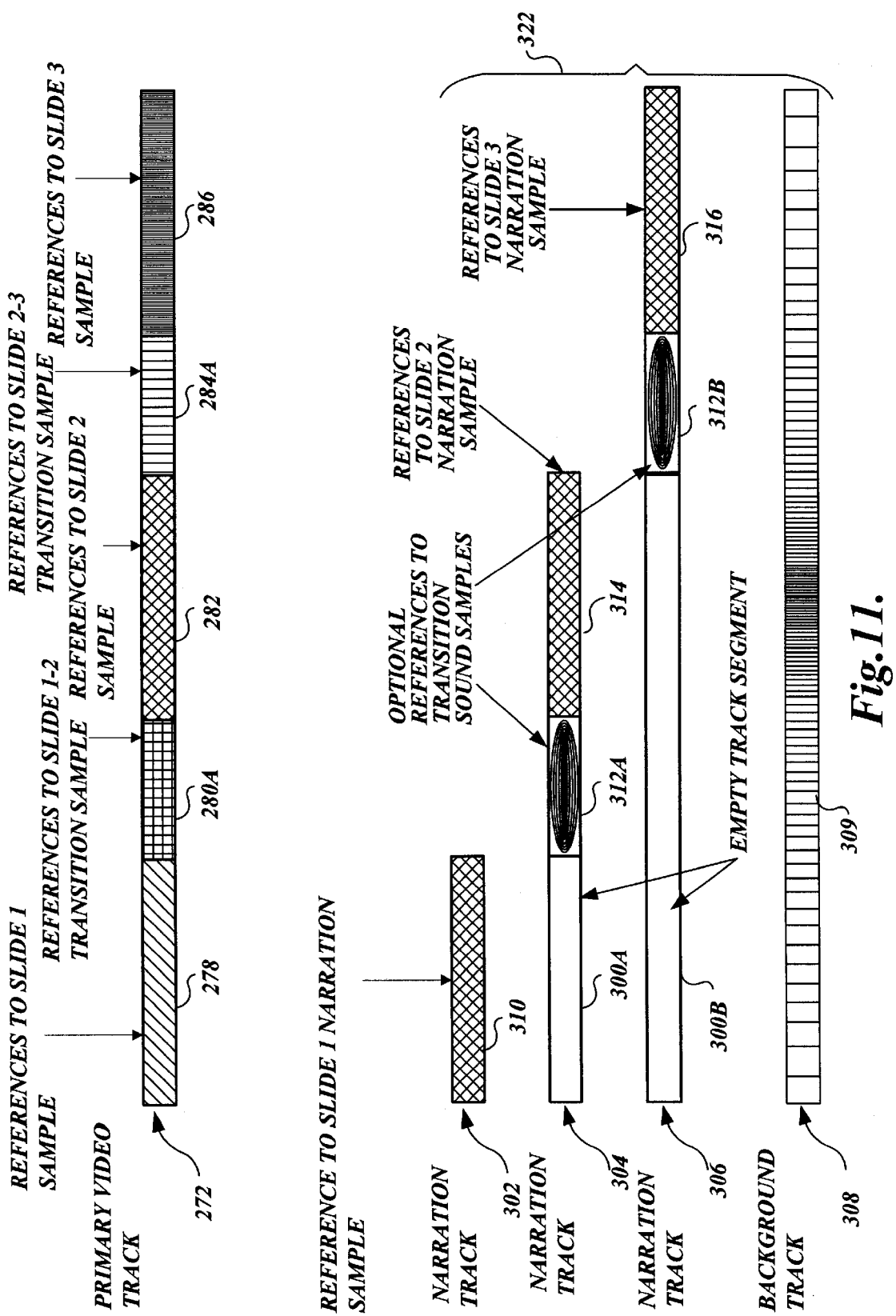
FIG. 11 illustrates an example of the details of audio tracks generated with frame-based transformation.

FIG. 11 illustrates an audio media 322 that includes narrative and background audio tracks that are referenced to the primary video track 272 for the frame-based movie file. In this embodiment, a separate narration track is provided for each narration audio sample which is referenced to a corresponding slide video sample disposed on the primary video track 272. For example, the (first slide) video sample 278 on the primary video track 272 is referenced to a first slide narration audio sample 310 disposed on a first narration track 302.

A second slide narration audio sample 314 is disposed on a second narration track 304. The second slide narration audio sample 314 is referenced to the (second slide) video sample 282 positioned on the primary video track 272. Also, a first transition narrative audio sample 312A is disposed on the second narration track 304 and referenced to the video sample 280A that is positioned on the primary video track 272. Additionally, an empty audio segment 300A is disposed on the second narration track 304 and referenced to the (first slide) video sample 278 position on the primary video track 272.

A third slide narration audio sample 316 is disposed on a third narration track 306. The third slide narration audio sample 316 is referenced to the position of the (third slide) video sample 286 disposed on the primary video track 272. Also, a second transition narrative audio sample 312B is disposed on the third narration track 306 and referenced to the position of the video sample 284A disposed on the primary video track 272. An empty audio segment 300B is disposed on the third narration track 306 and referenced to the positions of the (first slide) video samples 278, 280A and 282.

Additionally, a background audio sample 309 is disposed along the length of a background audio track 308 which runs from the beginning of the primary video track 272 through the end. It will be appreciated that the background audio sample may be started and/or ended at any point during the play back of the movie file to a user. It is also envisioned that multiple background soundtracks may be provided with the movie file.

Figure 12:
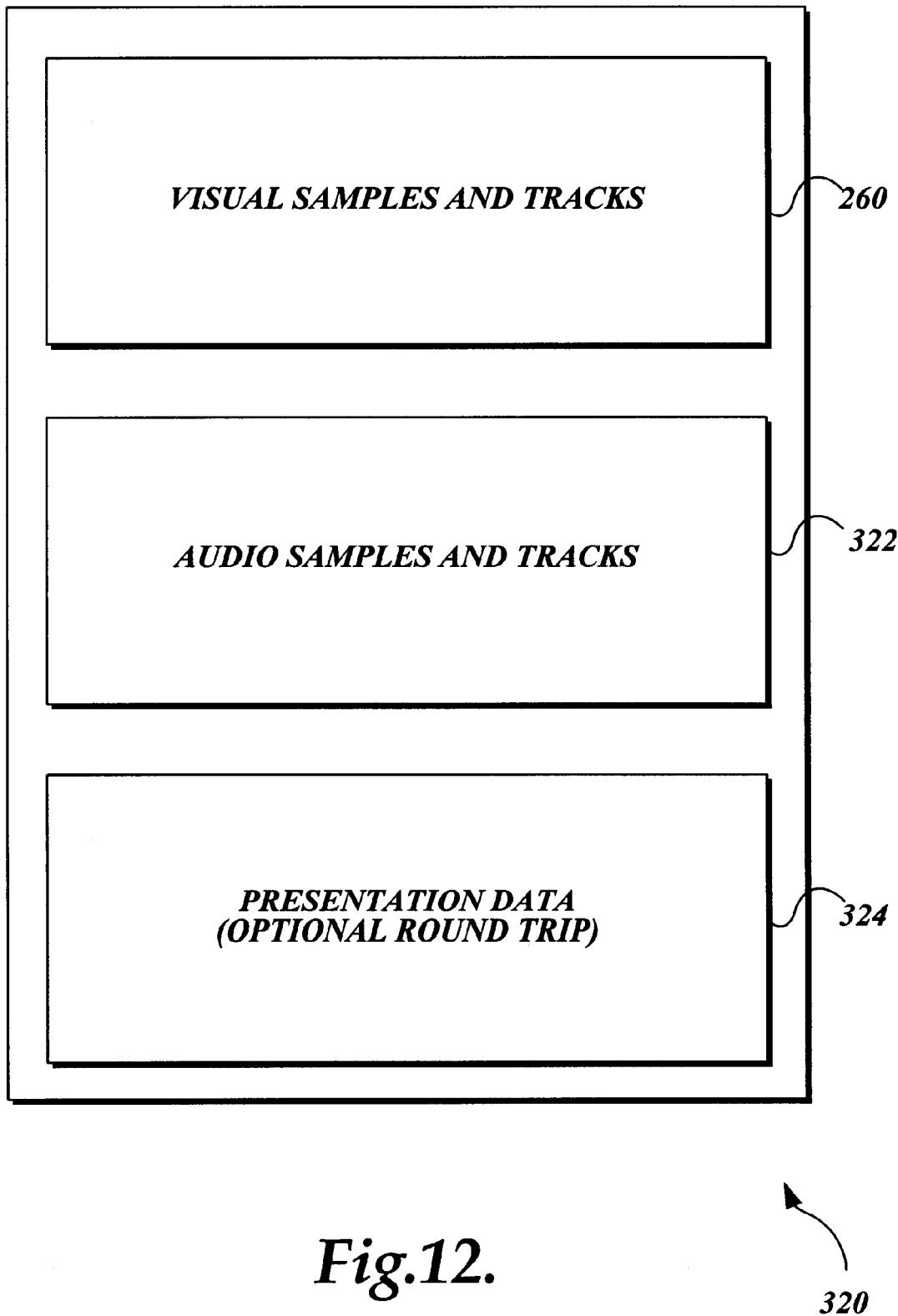
FIG. 12 illustrates a conceptual file structure for a movie file formed in accordance with the present invention.

FIG. 12 illustrates an exemplary data structure for saving media in a movie file 320 formed in accordance with the present invention. The movie file 320 includes the video media 260 which is further illustrated in FIG. 10. The movie file 320 also includes the audio media 322 that is shown in FIG. 11. Additionally, when the round-trip movie file option is selected, presentation media 324 will be included in the movie file 320. Also, special visual (spatial)/audio samples and tracks 325 may be included in the presentation media 324 so that interactivity, breaking out text and virtual reality features can be supported. The virtual reality features may include haptic feedback (sense of touch), the sense of smell(s), three dimensional sound and immersive spatial representations (visual images). The presentation media 324 is a container for a copy of the objects in the slide show presentation. Since the objects in the slide show presentation are saved in a presentation format recognized by a presentation program, the presentation program may present the slide show presentation by accessing the objects contained in the presentation media 324.

Figure 4:
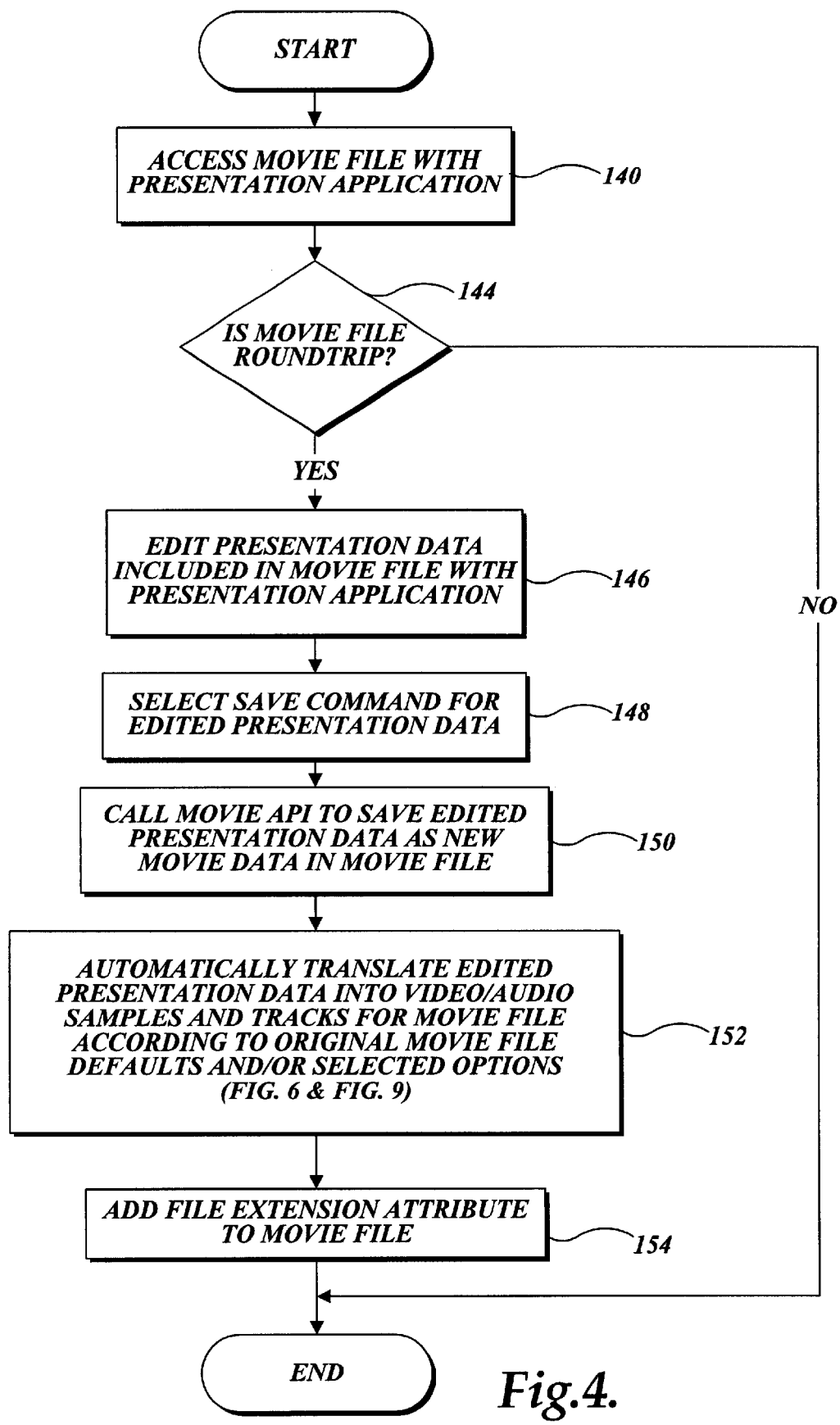
FIG. 4 is a flow diagram illustrating an overview for editing slide show presentation objects included in a round-trip movie file and saving the file with the previously selected options and/or defaults.

FIG. 4 is a flow diagram illustrating the logic for editing a movie file previously created in accordance with the present invention. Moving from a start block to a block 140, a movie file is accessed with a presentation program. It is also envisioned that another type of application program may be employed to access the movie file. The logic then proceeds to a decision block 144 where a test is made to determine if the movie file is a round-trip movie file. The presentation program will open the movie file to determine if the movie file is a round-trip movie file. If the test is false, the logic jumps to an end block and terminates because the movie file cannot be edited with the presentation program.

However, if the determination at decision block 144 is true, the logic steps to a block 146 where the slide show presentation objects included in the movie file are edited with the presentation program. The logic flows to a block 148 where a save command in the presentation program is selected for saving the edited slide show presentation objects in the movie file. The logic then proceeds to a block 150 where a movie API such as "QuickTime" is called to save the edited slide show presentation objects in the movie file. Advancing to a block 152, the slide show presentation objects are automatically transformed into video and/or audio samples and tracks for saving in the movie file according to the original movie file defaults and/or selected options. The transformation methods for the objects in the slide show presentation are further illustrated in FIGS. 6 and 9. The logic then steps to a block 154 where a file extensions/attributes of the movie file are optionally changed to reflect a selection by the user. Next, the logic steps to the end block and terminates.

Figure 5A:
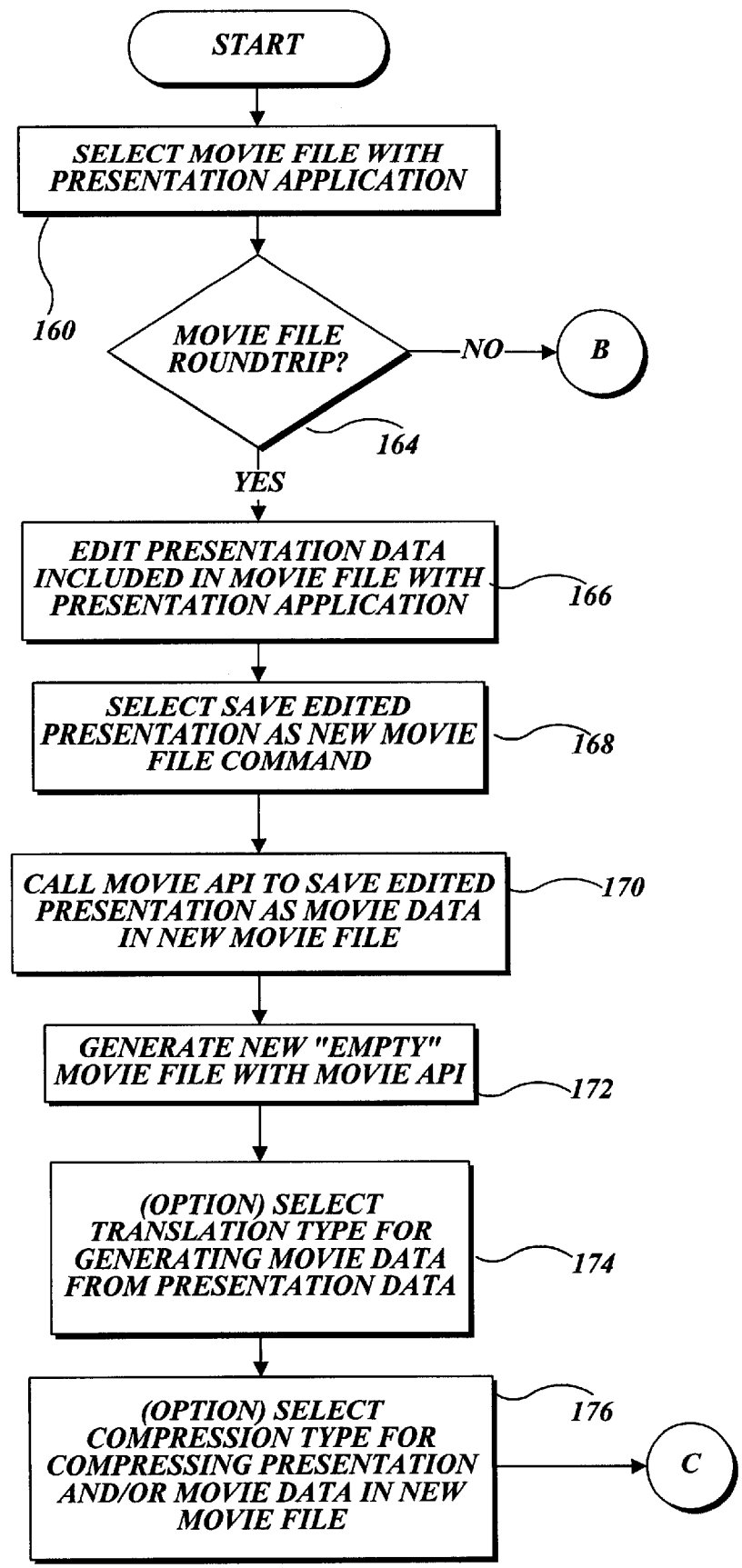
FIGS. 5A and 5B illustrate a detailed flow diagram for editing objects in the slide show presentation that are included in a round-trip movie file and saving the file with modified options and/or defaults.
Figure 5B:
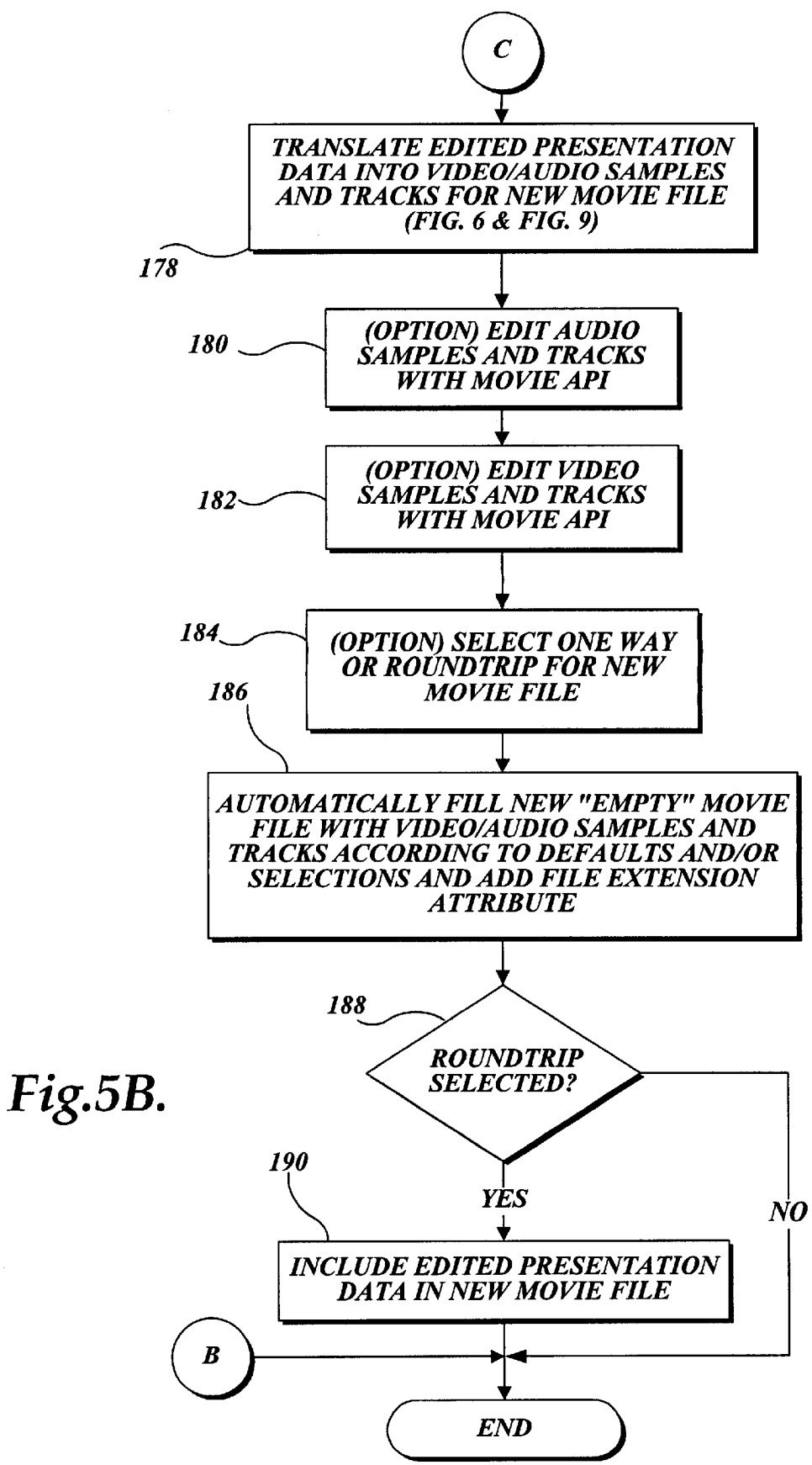

FIG. 5 illustrates the logic for editing objects in the slide show presentation and movie data in an original round trip movie file and saving the edited slide show presentation objects and movie data in another (new) round trip movie file so that the original round trip movie file is not changed by the editing.. Moving from a start block, the logic steps to a block 160 where a previously created (original) movie file is selected for editing with a presentation program. At a decision block 164, a test is made to determine if the original movie file is a round-trip file. If not, the logic jumps to an end block and terminates.

However, if the original movie file is a round-trip movie file, i.e., the file includes presentation and movie data, the logic proceeds to a block 166 where the slide show presentation objects included in the original movie file are edited using the presentation program. The logic advances to a block 168 where a "Save As New Movie File" command is selected. The logic then moves to a block 170 where a movie API is called to generate new movie data for a new movie file that will be included the edited slide show presentation objects. Stepping to a block 172, the empty new movie file is generated by the movie API. The logic then proceeds to a block 174 where the type of transformation method may be selected for generating new movie data from the edited slide show presentation objects. If the transformation method is not selected, a default transformation method may be employed by the present invention. Also, the present invention may determine a transformation method that is optimally suited for transforming the slide show presentation objects into movie data.

Flowing to a block 176, a type of compression method for compressing the edited slide show presentation objects and/or movie data in the new movie file may optionally be selected. The logic then moves to a block 178 where the edited slide show presentation objects are transformed into video and/or audio samples and tracks for the new round trip movie file. Further details of the transformation and compression processes are provided in the discussion of FIGS. 6 and 9 above.

Next, the logic proceeds to a block 180 where the audio samples and tracks may (optionally) be edited with the movie API. The logic then advances to a block 182 where the user may optionally edit the video samples and tracks using the movie API. The logic then moves to a block 184 where a selection is made to save the edited original round trip movie file as either a new round trip movie file or a one-way movie file, i.e., a one way movie file only includes movie data and does not include slide show presentation objects. The logic then proceeds to a block 186 where the empty new movie file is automatically filled with video/audio samples and tracks according to defaults and/or selections by the user. Also, a file extensions/attributes are added to indicate the format of the movie data in the new movie file. The logic then moves to a decision block 188 where a test is made to determine if the movie file was selected to be a "round-trip" movie file. If true, the logic proceeds to a block 190 where the edited slide show presentation objects are added to the new "round trip" movie file. The logic moves to an end block and terminates.

Figure 13:
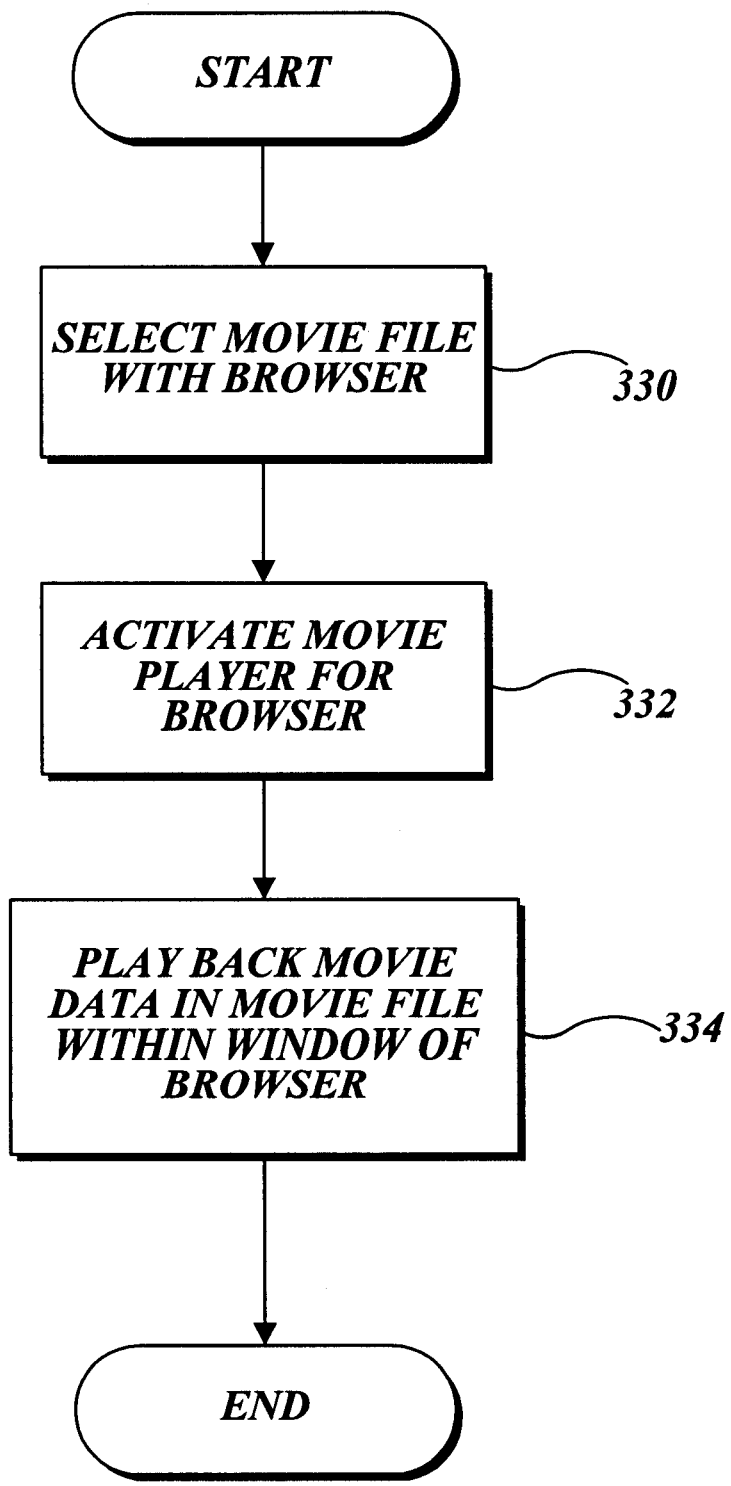
FIG. 13 is a flow diagram illustrating an overview of playing back a movie file with an application program that is different than the presentation program employed to create the slide show presentation.

FIG. 13 is a flow diagram illustrating the logic used to display the movie of the slide show presentation with any program, e.g., a browser, application, or an operating system, that is capable of playing back the movie file 320. Moving from a start block, the logic steps to a block 330 where the movie file 320 is selected with a "browser" program. It is envisioned that the browser program may be a stand alone program or an integrated part of a movie-enabled operating system. In the case of a movie-enabled operating system, the movie file 320 may be selected by opening a window that contains an icon representing the movie file and selecting the icon displayed in the window. The logic then proceeds to a block 332 where a movie player facility, e.g., a "JAVA" applet plug-in, may be activated by the browser program to play back the selected movie file. The activated movie player facility recognizes the format of the movie data in the file, i.e., the audio/video samples and tracks. The logic then moves to a block 334 where the movie data in the movie file is played back in a window of the browser program by the movie player facility. The play back of the movie file in the browser's window enables a user to view a movie of the slide show presentation without having to install and run the presentation program originally employed to create the slide show presentation. However, if the original presentation program is capable of playing back the movie file, it may also be employed to display the movie of the slide show presentation. The logic advances to an end block and terminates.

Figure 15A:
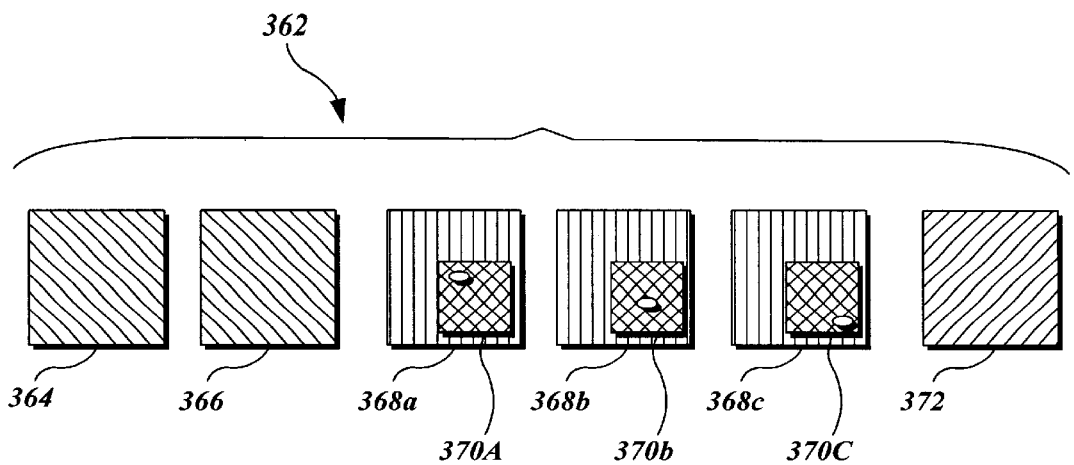
FIG. 15A illustrates the play back of a movie file with a movie within a movie option.

FIG. 15A illustrates an overview 362 of the play back of a movie file that includes "a movie within a movie" effect. The first slide 364 is shown playing back for a determined time interval or until an advance, reverse or pause control is selected. Similarly, a second slide 366 is played back for another determined time interval or until an advance, reverse, or pause control is selected. The play back of the movie data for a third slide (368A, 368B and 368C) is illustrated with a portion of the display of the third slide overlaid by the play back of another movie (370A, 370B and 370C).

Figure 15B:
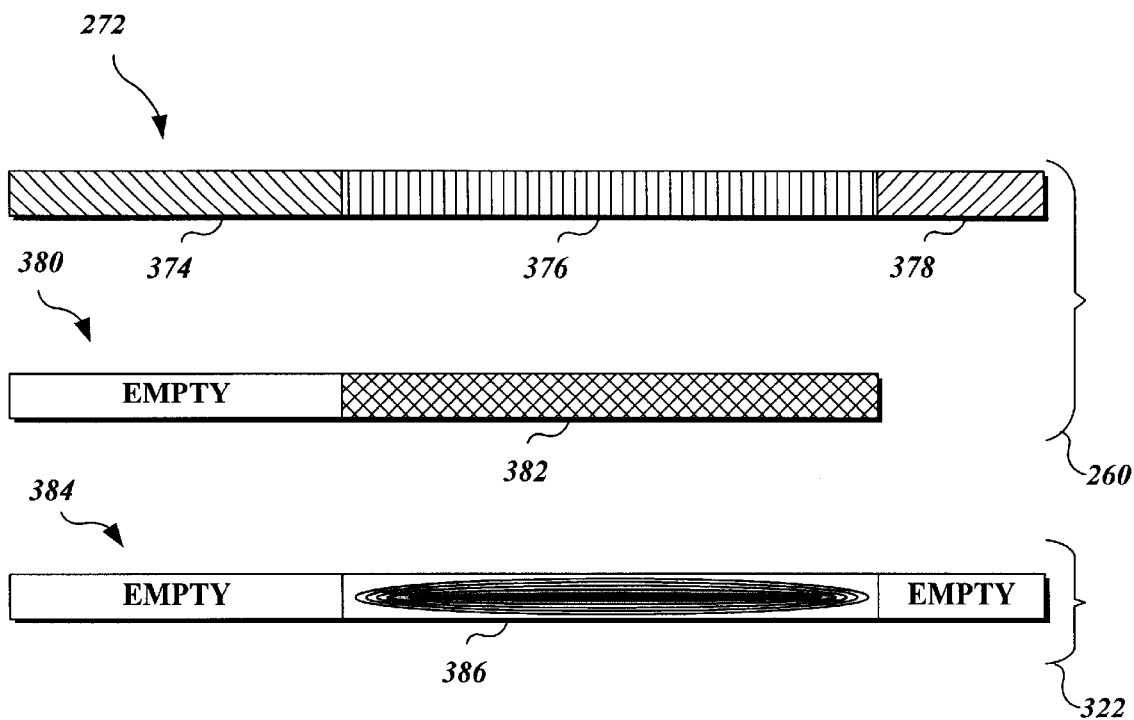
FIG. 15B shows the video and audio tracks for the movie file with the movie within a movie option.

In FIG. 15B, the organization of the video media 260 and the audio media 322 for the "movie within a movie" effect is illustrated. The samples referenced from the primary video track 272 and sample(s) referenced from the movie within a movie video track 380 are separately disposed in the video media 260. A video sample 374 for the play back of the first slide 364 and the second slide 366 is referenced to a portion of the primary video track 272. Another video sample 376 for the playback of the third slide (368A, 368B and 368C) is referenced to another portion of the primary video track 272. Similarly, a video sample 378 for the play back of the fourth slide 372 is referenced to a portion of the primary video track 272. Another video sample 382 is referenced to the playback of the movie within a movie effect on the video track 380. Also, in this embodiment, the play back of a separate movie within a movie audio sample 386 is referenced to a portion of an audio track 384 in the audio media 322 and which corresponds to the play back of the video sample 382 referenced to the video track 380.

Figure 16A:
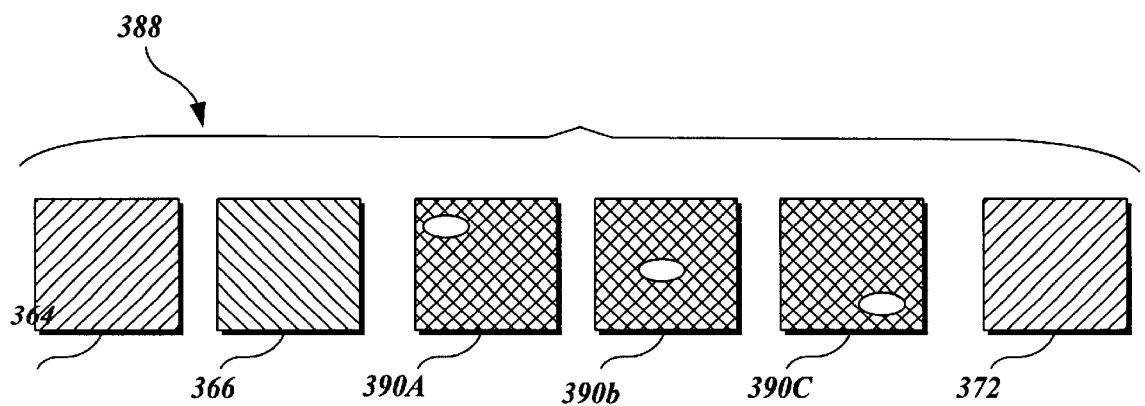
FIG. 16A illustrates the play back of a movie file with an inline movie option.

FIG. 16A illustrates an overview 362 of the play back of a movie file that includes "an inline movie" effect. The first slide 364 is shown playing back for a determined time interval or until an advance, reverse or pause control is selected. Similarly, the second slide 366 is played back for another determined time interval or until an advance, reverse, or pause control is selected. The play back of the movie data for the third slide (368A, 368B and 368C) is not illustrated. Instead, the display of the third slide is completely replaced by the play back of an inline movie (390A, 390B and 30C) for a determined interval or until an advance, reverse or pause control is selected.

Figure 16B:
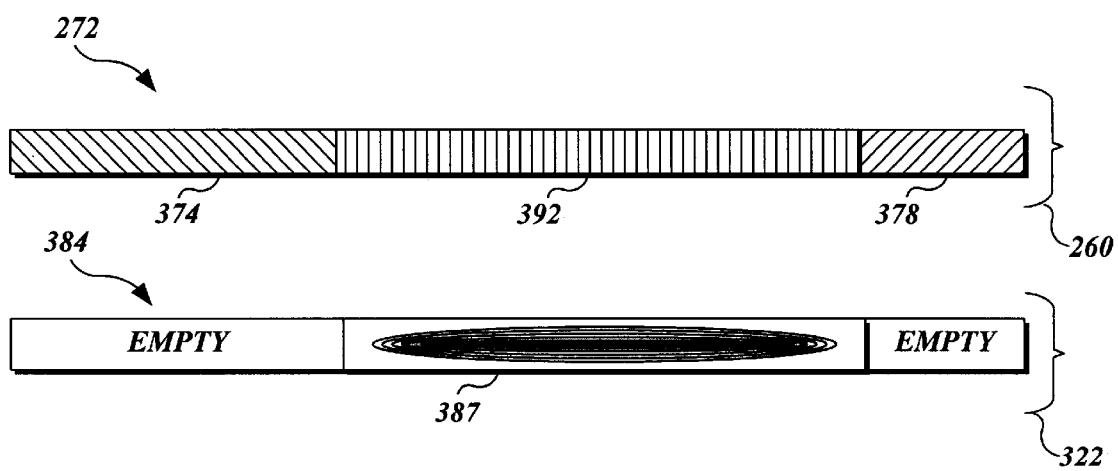
FIG. 16b shows the video and movie tracks for the movie file with the inline movie option.

In FIG. 16B, the organization of the video media 260 and the audio media 322 for the "inline movie" effect is illustrated. The samples referenced by the primary video track 272 are disposed in the video media 260. The video sample 374 for the play back of the first slide 364 and the second slide 366 is referenced to a portion of the primary video track 272. Another video sample 392 for the playback of the in line movie (390A, 390B and 390C) is referenced to another portion of the primary video track 272. Similarly, the video sample 378 for the play back of the fourth slide 372 is referenced to a portion of the primary video track 272. Also, an inline movie audio sample 387 is referenced to a portion of an inline movie audio track 384 in the audio media 322 and which corresponds to the play back of the in line movie video sample 392.

Additionally, it is envisioned that the movie within a movie and the inline movie option may be employed to integrate home video clips and video clips from other application into the play back of the movie file for the slide show presentation.

Figure 17:
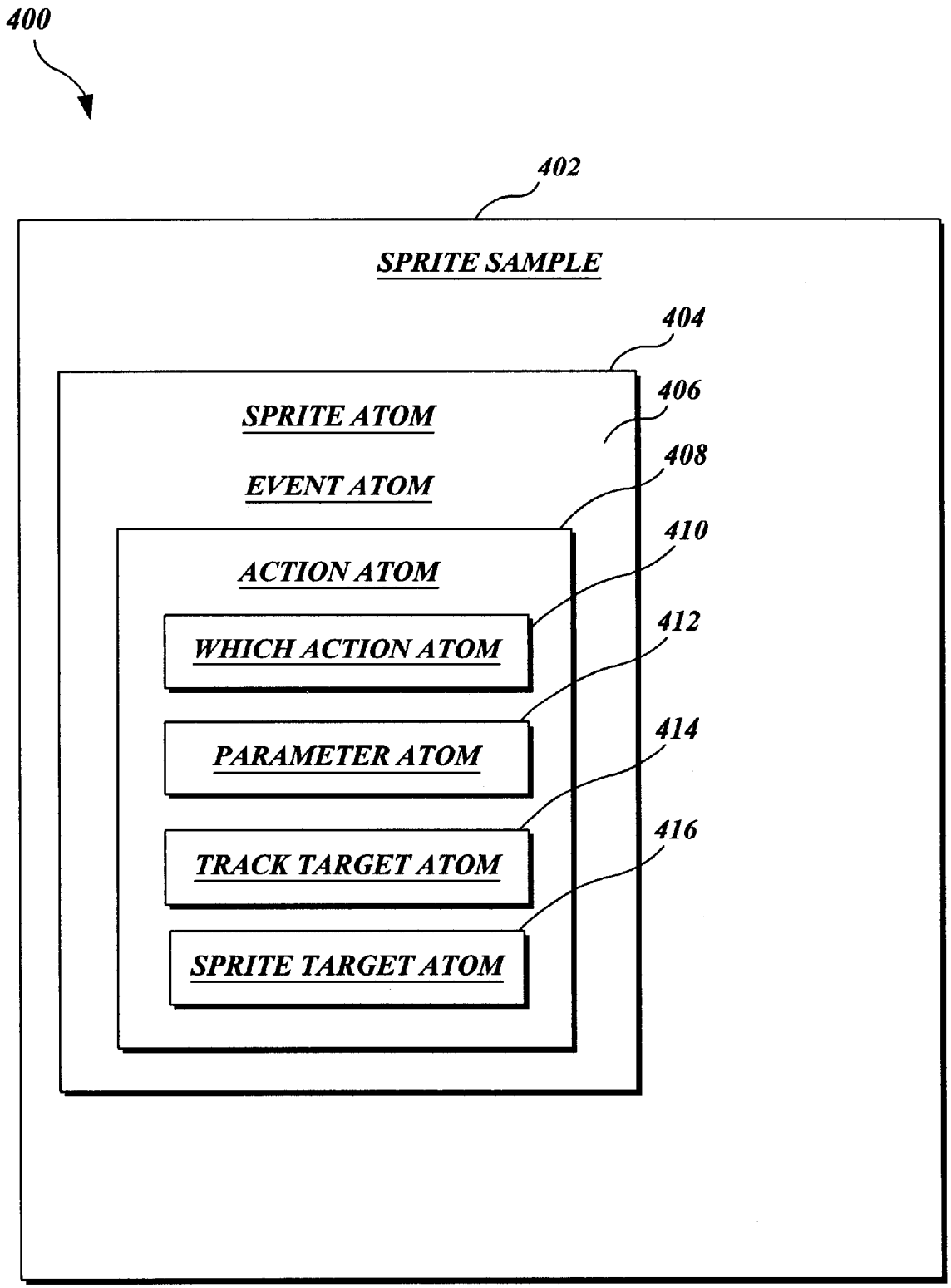
FIG. 17 illustrates an overview for the structure of a sprite video sample.

FIG. 17 illustrates an overview 400 of the organization of a sprite based video sample in a movie file. A sprite based video sample container 402 includes a sprite atom 404. Each atom has a type, identification and index and it may include data and/or other atom(s). An event atom 406 is disposed within the sprite atom 404. The event atom 406 includes a type and an identification, e.g., event atom type= KQTEventType and event atom id=KQTEventMouseClick. An action atom 408 is included in the event atom 406 and it includes a type and an identification. For example, the action atom 408 type=KAction and id=0.

The action atom 408 may include several different types of atoms. For example, a which action atom 410 is included in the action atom 408 and it indicates a type, identification and data, e.g., type=KWhichAction, id=1, index=1 and data that includes an 'action specifier'. A parameter atom 412 is also included in the action atom 408. The parameter atom 412 indicates a type, identification, index and data. For example, type=KActionParameter, id=0, index= KFirstParam and data that includes parameter data. A target atom 414 and a sprite target atom 416 are shown included in the action atom 408. However, the target atom 414 and the sprite target atom 416 are usually only included when the action is not to be performed on a default track and sprite.

Figure 18:
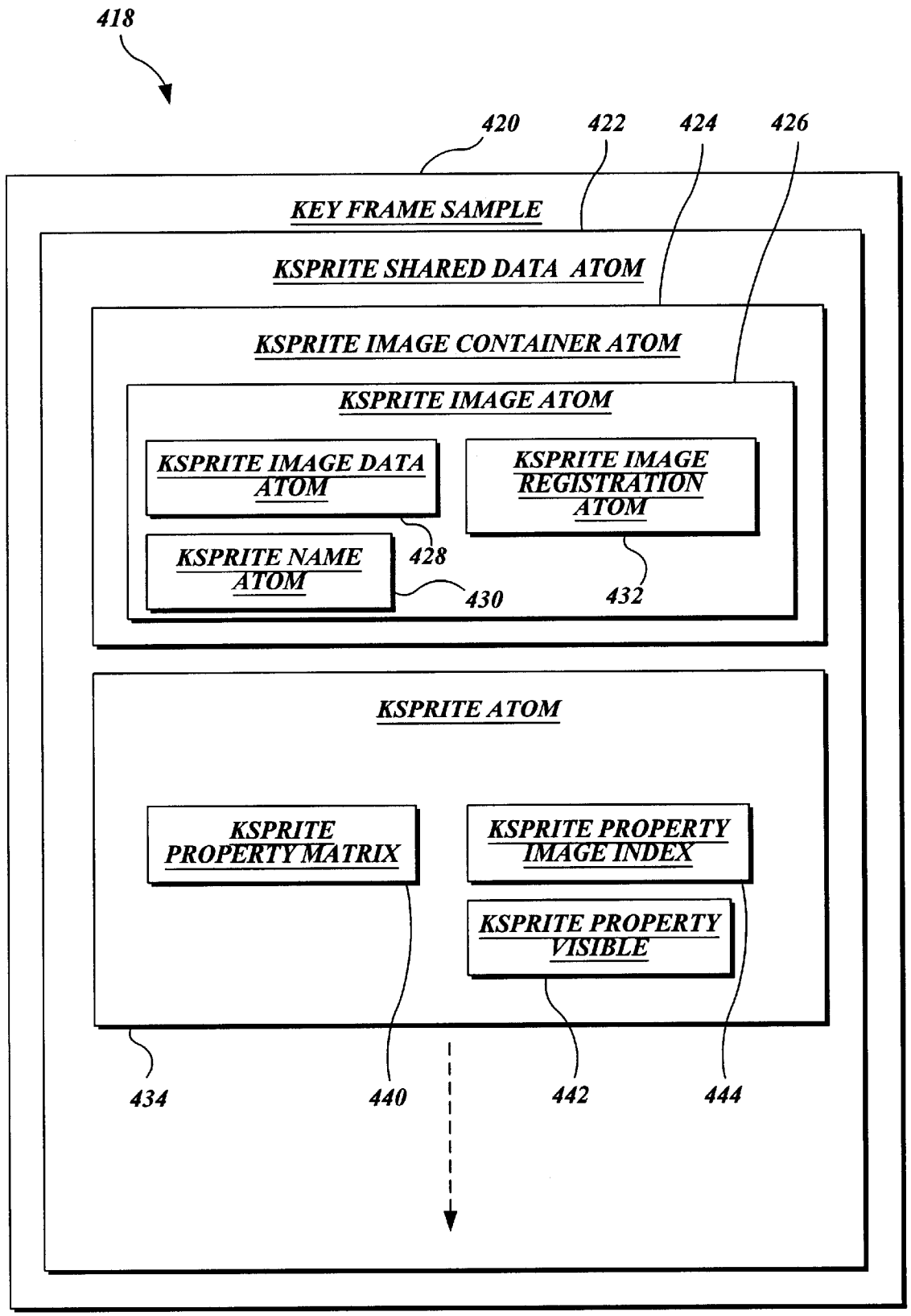
FIG. 18 shows an overview for the structure of a key frame video sample.

In FIG. 18, an overview 418 of the structure for a key frame sample for a sprite based video track. A key frame sample container 420 includes atoms and all data for showing the slides in the movie file. A Ksprite shared data atom 422 is included in the key frame sample container 420 and it includes a Ksprite atom images container 424. The container 424 includes a Ksprite image atom 426 for each image which indicates an identification, e.g., id=image id. The Ksprite image atom 426 includes a Ksprite image data atom 428 which includes image data, i.e., pictures and compressed data with an image description header. Also, the Ksprite image atom 426 includes a Ksprite name atom 430 and a Ksprite registration atom 432.

A Ksprite atom 434 is included in the Ksprite shared data atom 422 and it indicates an identification value, e.g., id=sprite id. The Ksprite atom 434 includes a Ksprite property matrix 440 for data describing the position of the respective sprite image. Included in the Ksprite atom 434 is a Ksprite property visible parameter 442 which is set either true or false for the respective image. A Ksprite property layer 438 along with a Ksprite property image index 444 is included in the Ksprite atom 434. The Ksprite property image index 444 indicates which image is associated with the Ksprite atom 434. Although not shown, the Ksprite atom 434 includes a sprite name and graphics mode and it may also include action atoms. Additionally, for each image described in the Ksprite shared data atom 422, there is one Ksprite image atom and one Ksprite atom.

Figure 19A:
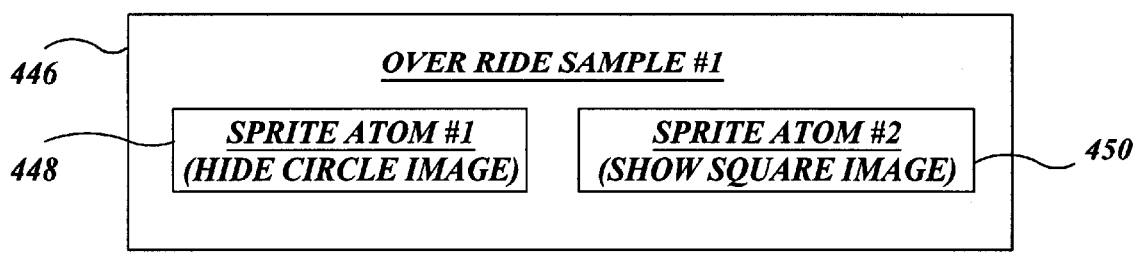
FIGS. 19A–19D illustrate overviews of the structure for over ride sprite video sample.
Figure 19B:
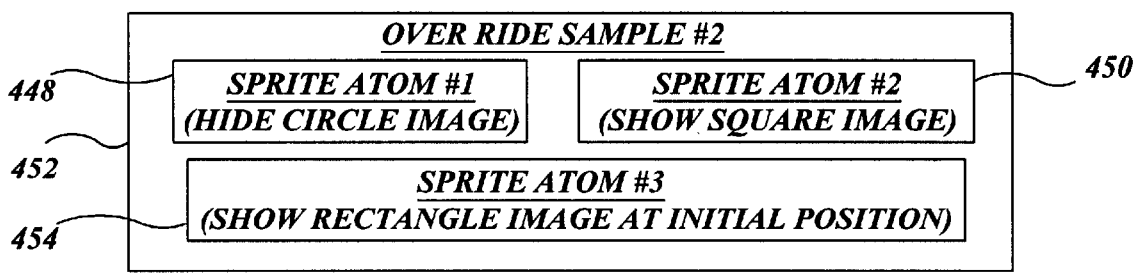
Figure 19C:
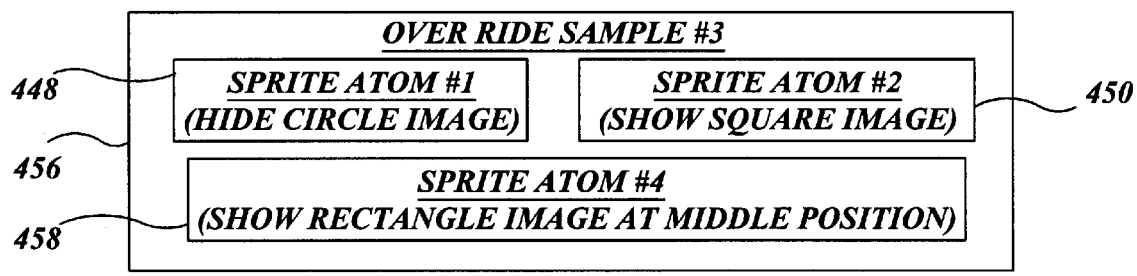

FIGS. 19A, 19B, 19C and 19B illustrate four over ride video samples that are sprite atom based. The over ride samples are used to change the display of images that are included in the key frame sample 420 shown in FIG. 18 and produce the movie image sequence as illustrated in FIG. 21.

Figure 19D:
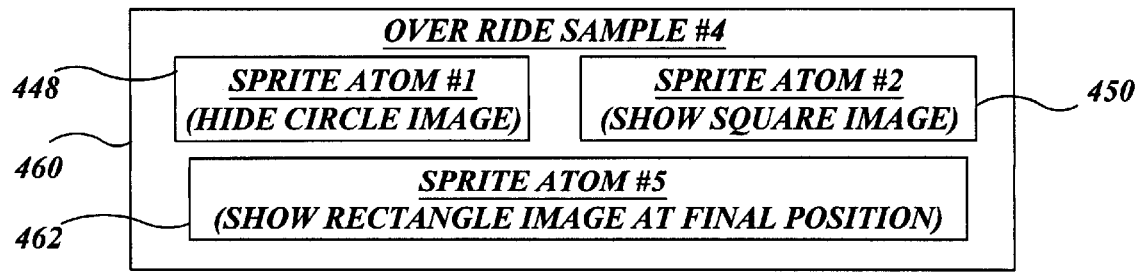

In FIG. 19A, a first over ride sample 446 is illustrated which includes a first sprite atom 448 that causes a circle image to hidden, i.e., not displayed. Also, the first over ride sample 446 includes a second sprite atom 450 that causes a square image to be displayed. FIG. 19B shows a second over ride sample 452 that includes the first sprite atom 448 and the second sprite atom 450. Also, the second over ride sample 452 includes a third sprite atom 454 that causes a rectangle image to be displayed at an initial position. In FIG. 19C, a third over ride sample 456 is shown and it includes the first sprite atom 448 and the second sprite atom 450. The third over ride sample 456 also includes a third sprite atom 458 that causes a rectangle image to be displayed at a middle (intermediate) position. Additionally, FIG. 19D shows a fourth over ride sample 460 that includes the first sprite atom 448 and the second sprite atom 450. Also, the fourth over ride sample 460 includes a third sprite atom 462 that causes a rectangle image to be displayed at a final position.

Figure 20:
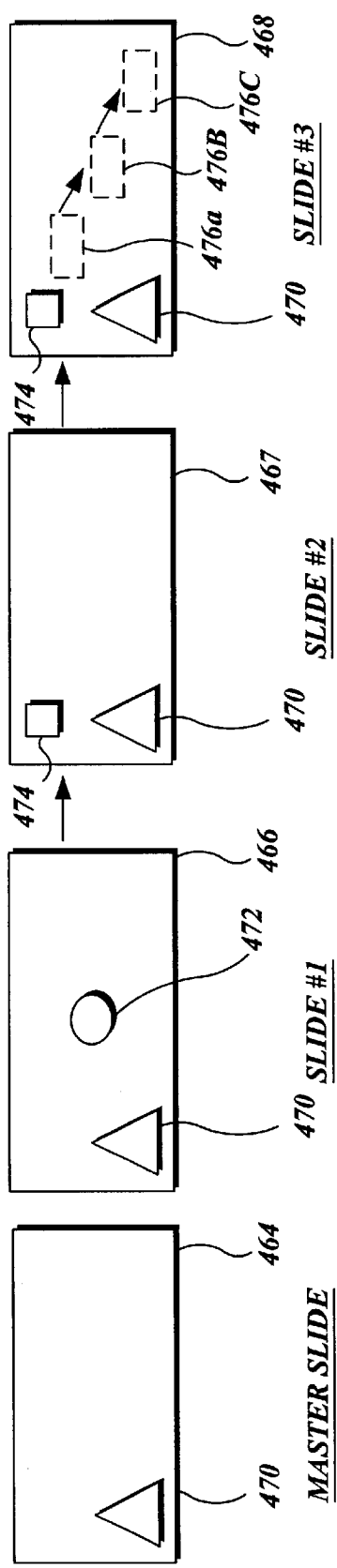
FIG. 20 shows the display of a master slide, a first slide and a second slide with an animation.

FIG. 20 illustrates the sequential display of a master slide 464, a first slide 466, a second slide 467 and a third slide 468. A triangle image 470 is displayed in the lower left corner of the rectangular shaped master slide 464. The display of the first slide 466 causes the triangle image 470 to be included along with a display of a circle image 472 in the center of the rectangular shaped first slide. Next, the display of the second slide 467 causes the display of the circle image 472 to not be visible, the triangle image 470 to be visible in the lower left corner and a square image 474 to be visible in the upper left hand corner. In the third slide 468, a rectangle image (476A, 476B and 476C) is shown sequentially displayed at three different locations in the second slide 468, i.e., the rectangle image is animated from the upper left to the lower right of the display for the third slide. Also, the triangle 470 and square remain visible in the display of the third slide 468.

Figure 21:
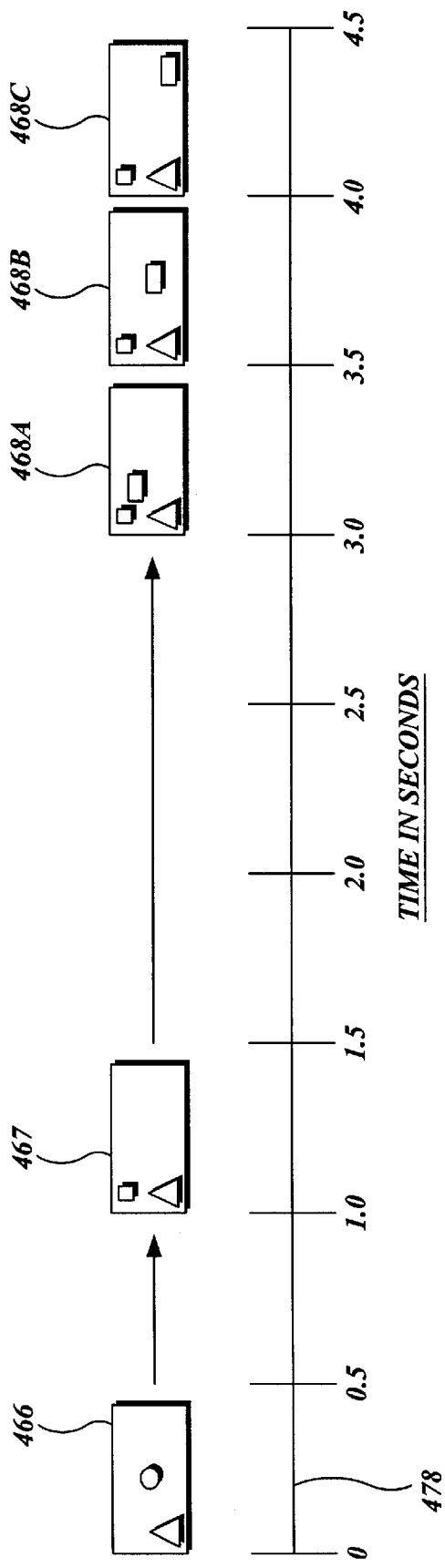
FIG. 21 illustrates a timeline for the display of the first slide and the animation of the second slide with over ride sprite video samples.

FIG. 21 illustrates a time line 478 in seconds for the sequential display of the contents of the first slide 466, the second slide 467 and the animation of the contents of the third slide 468 as shown in FIG. 20. A first over ride sample 468A is added at time position 1 second, with a duration of 2 seconds. A second over ride sample 468B is added at time position 3 seconds, with a duration of 0.5 seconds. A third over ride sample 468C is added at time sample 3.5 seconds with a duration of 0.5 seconds. A fourth over ride sample 468D is added at time position 4 seconds, with a duration of 0.5 seconds.

In FIG. 21, the contents of the first slide 466, i.e., the triangle image 470 and the circle image 472, are displayed for one second of the time line 478. Next, the second slide 467 displays the triangle image 470 and the square image 474 for two seconds. In the second slide 467, the first over ride sample 446 (shown in FIG. 19A) is employed to hide the circle image 472 and cause the square image 474 to be visible.

In a first animation step 468A of the third slide, the triangle image 470, the square image 474 and the rectangle image 476A are displayed for ½ of a second. The second over ride sample 452 (shown in FIG. 19B) hides the circle image 472 and causes the square image 474 and the rectangle image 476A to be visible. A second animation step 468B displays the triangle image 470, the square image 474 and the rectangle image 476B for ½ of a second. The third over ride sample 456 (shown in FIG. 19C) hides the circle image 472 and causes the display of the square image 474 and the rectangle image 476B. A third animation step 468C displays the triangle image 470, the square image 474 and the rectangle image 476C for ½ of a second. The fourth over ride sample 460 (shown in FIG. 19D) hides the circle image 472 and causes the square image 474 and the rectangle image 476C to be displayed.

Although the embodiments discussed above are substantially directed to transforming a slide show presentation into a movie file, it is envisioned that the present invention may be more generally employed to transform the display of pages for any non-movie document into a movie. Moreover, the displaying of the pages for a non-movie document produced with another type of application program such as a word processor, spreadsheet, or database, would be transformed by the present invention into a movie file in substantially the same manner as discussed above for the transformation of slides produced with a presentation application into movie data stored in a file. It is also envisioned that generally any movie-enabled program such as an application and/or an operating system may be employed to view any movie file generated by the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating a movie file from a slide show presentation that includes a plurality of slides, the playing of the movie file causing a movie of the slide show presentation to be displayed, comprising:
   (a) selecting the slide show presentation to be saved as movie data in the movie file;
   (b) identifying each object in each slide of the slide show presentation;
   (c) automatically transforming each object in the slide show presentation into corresponding movie data; and
   (d) saving the movie data in the movie file, so that the movie of the slide show presentation is displayed when a program capable of playing the movie file is employed to open the movie file.

2. The method of claim 1, further comprising copying the objects of the slide show presentation into the movie file, so that the slide show presentation is displayed to the user when a program capable of presenting the slide show presentation is employed to open the movie file.

3. The method of claim 1, further comprising selectively compressing the content of the movie file, the content of the movie file including movie data and objects in the slide show presentation.

4. The method of claim 3, wherein compressing the contents of the movie file further comprises selecting a type of compression method.

5. The method of claim 4, wherein compressing the contents of the movie file further comprises selecting a type of optimization for the compression method.

6. The method of claim 1, wherein the saving of the movie data in the movie file further comprises adding a file extension to the movie file, the file extension indicating a format of the movie data in the movie file.

7. The method of claim 1, wherein the saving the movie data in the movie file further comprises adding a file attribute to the movie file, the file attribute indicating a format of the movie data in the movie file.

8. The method of claim 1, further comprising selecting at least one of the plurality of slides in the slide show presentation to correspond to at least one visual sample.

9. The method of claim 8, wherein the movie data further comprises visual samples linked to references on a track, the visual samples being contained in a media.

10. The method of claim 9, wherein the visual sample is a video sample that is linked to a position on a video track, the position on the video track being referenced to the corresponding slide in the slide show presentation.

11. The method of claim 10, further comprising another video sample associated with a transition between slides in the slide show presentation.

12. The method of claim 11, wherein the other video sample is linked to a position on another video track, the position on the other video track being referenced to the corresponding transition in the slide show presentation and another position on the video track linked to the video sample.

13. The method of claim 12, wherein the media is video media, the video media being a container for video data, the video data including the video sample, the other video sample, the video track and the other video track.

14. The method of claim 1, wherein selecting the slide show presentation to be saved as movie data causes a movie application programming interface (API) to be called to save the movie data in the movie file.

15. The method of claim 14, wherein the movie API includes "QuickTime" and "Video for Windows."

16. The method of claim 14, further comprising editing the movie data with functions provided by the movie API.

17. The method of claim 16, wherein editing the movie data further comprises generating a video effect for the video data, the video effect including fade, wipe, move, swivel and spiral.

18. The method of claim 16, wherein editing the movie data further comprises selecting the key frame rate for the video sample.

19. The method of claim 16, wherein editing the movie data further comprises selecting a number of colors to be used for an image in the video sample.

20. The method of claim 16, wherein editing the movie data further comprises selecting a size of a display for playing back the movie.

21. The method of claim 16, wherein editing the movie data further comprises selecting a position of a display of the movie in a display window.

22. The method of claim 16, wherein editing the movie data further comprises selecting a default time period for playing the video sample that corresponds to the slide in the slide show presentation.

23. The method of claim 16, wherein editing the movie data further comprises selecting an inline movie to overlap the entire display of the video sample that corresponds to the slide in the slide show presentation.

24. The method of claim 16, wherein editing the movie data further comprises selecting a movie within a movie to overlap a portion of the display of the video sample that corresponds to the slide in the slide show presentation.

25. The method of claim 1, further comprising selecting at least one Graphic Interchange Animation (GIF) object in the slide show presentation to be transformed into an image include in the movie data.

26. The method of claim 1, wherein transforming each type of object in the slide show presentation into corresponding movie data further comprises selecting a transformation method, including sprite-based, frame-based and vector graphic-based.

27. The method of claim 8, wherein the movie data further comprises an audio sample linked to an audio track, the audio sample being contained in an audio media and being associated with a sound produced for a slide by the slide show presentation.

28. The method of claim 27, wherein the audio sample is linked to a position on the audio track, the position being referenced to the associated sound produced for the slide by the slide show presentation.

29. The method of claim 27, further comprising another audio sample that is associated with another sound produced for a transition between slides by the slide show presentation.

30. The method of claim 29, wherein the other audio sample is linked to a position on another audio track, the position on the other audio track being referenced to the associated sound produced for the transition between slides and another position on the audio track for the audio sample.

31. The method of claim 30, wherein the audio media is a container for audio data, the audio data including the audio sample, the other audio sample, the audio track and the other audio track.

32. The method of claim 31, further comprising editing the audio data with functions provided by a movie API.

33. The method of claim 27, wherein the sound produced for the slide comprises a slide narration.

34. The method of claim 29, wherein the other audio sample comprises a background sound.

35. The method of claim 1, wherein the program capable of playing the movie file includes a browser program, a presentation program and an operating system.

36. A computer-readable medium having computer-executable instructions for performing the method recited in any one of claims 1, 2, 3, 6 or 7.

37. A method for generating a movie file from a slide show created with a presentation program, a movie of the slide show presentation being display able by a program capable of playing the movie file, comprising:
  (a) selecting the slide show presentation to be saved as movie data in the movie file, the movie data including a video sample on a track;
  (b) identifying each object in the slide show presentation;
  (c) converting objects in the slide show presentation into movie data; and
  (d) saving the movie data in the movie file, so that the movie of the slide show presentation is displayed to a user when a program capable of playing the movie file is employed to play back the movie data in the movie file.

38. An apparatus for generating a movie file from a slide show created with a presentation program, the playing of the movie file causing a movie of the slide show presentation to be displayed, comprising:
  (a) a processing unit; and
  (b) a storage medium coupled to the processing unit, the storage medium storing program code implemented by the processing unit for:
    (i) selecting the slide show presentation to be saved as movie data in the movie file;
    (ii) identifying each type of object in the slide show presentation;
    (iii) automatically transforming each object in the slide show presentation into movie data; and
    (iv) saving the movie data in the movie file, so that the movie of the slide show presentation is displayed when a program capable of playing the movie file is employed to play back the movie data in the movie file.

* * * * *

UNITED STATES PATENT AND TRADEMARK OFFICE
CERTIFICATE OF CORRECTION

PATENT NO.    : 6,369,835 B1
DATED         : April 9, 2002
INVENTOR(S)   : T.H. Lin It is certified that error appears in the above-identified patent and that said Letters Patent is hereby corrected as shown below:

Column 1,
Lines 27-28, " "Microsoft Corporation," " should read -- Microsoft Corporation, --

Column 2,
Line 6, "common place" should read -- commonplace --
Line 15, "manner is" should read -- manner are --
Lines 32-33, "stand
              alone" should read -- stand --
              alone --
Line 36, " "Microsoft Corporation." " should read -- Microsoft Corporation. --
Line 38, " "Microsoft Corporation" " should read -- Microsoft Corporation --

Column 3,
Line 7, "type or extension" should read -- a type or extension --

Column 4,
Lines 33 and 36, "invention;," should read -- invention; --
Line 53, "objectsin" should read -- objects in --
Line 58, "diagram transforming" should read --- diagram illustrating transforming --

Column 5,
Line 15, "FIG. 16$b$" should read -- FIG. 16B --

Column 6,
Line 12, "system(BIOS)" should read -- system (BIOS) --

Column 7,
Line 44, "name extensions are" should read -- name extensions is --

Column 8,
Line 13, "displayed either" should read -- displayed, either --

Column 9,
Line 46, "FIG. 3A and 3B" should read -- FIGS. 3A and 3B --

Column 11,
Line 20, "at one" should read -- at least one --

UNITED STATES PATENT AND TRADEMARK OFFICE
CERTIFICATE OF CORRECTION

PATENT NO.     : 6,369,835 B1
DATED          : April 9, 2002
INVENTOR(S)    : T.H. Lin It is certified that error appears in the above-identified patent and that said Letters Patent is hereby corrected as shown below:

Column 12,
Line 18, "functions are" should read -- functions is --

Column 13,
Lines 25 and 31, "sample(s) are" should read -- sample(s) is --

Column 14,
Line 7, "file is a selected" should read -- file is selected --
Line 41, "on the effects" should read -- on the effect --
Line 51, "combination of a" should read -- combination of an --

Column 15,
Line 8, "278 position" should read -- 278 positioned --

Column 16,
Line 10, "where a file" should read -- where file --
Line 19, "editing.." should read -- editing. --
Line 65, "a file extensions/attributes" should read -- file extensions/attributes --

Column 17,
Line 13, "stand alone" should read -- stand-alone --

Column 18,
Line 4, " 30C)" should read -- 390C --
Line 23, "application into" should read -- applications into --
Line 48, "In FIG. 18, an" should read -- FIG. 18 illustrates an --

Column 19,
Line 15, "to hidden," should read -- to be hidden, --

Column 20,
Line 64, "saving the movie" should read -- saving of the movie --

Column 21,
Line 60, "include in the movie" should read -- included in the movie --

UNITED STATES PATENT AND TRADEMARK OFFICE
CERTIFICATE OF CORRECTION

PATENT NO. : 6,369,835 B1
DATED : April 9, 2002
INVENTOR(S) : T.H. Lin

It is certified that error appears in the above-identified patent and that said Letters Patent is hereby corrected as shown below:

<u>Column 22,</u>
Line 34, "display able" should read -- displayable --

Signed and Sealed this

Twenty-fifth Day of March, 2003

JAMES E. ROGAN
*Director of the United States Patent and Trademark Office*